2,977,935
PRESSURE DIFFERENTIAL OPERATED BRAKE BOOSTER MECHANISM

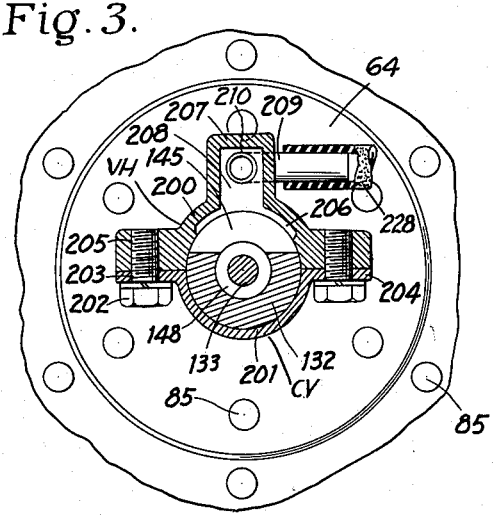
Fig. 3.
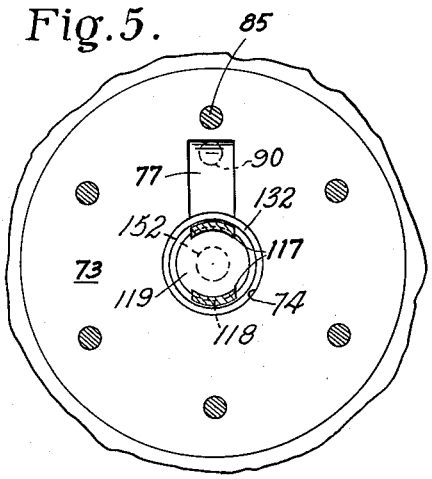
Fig. 5.
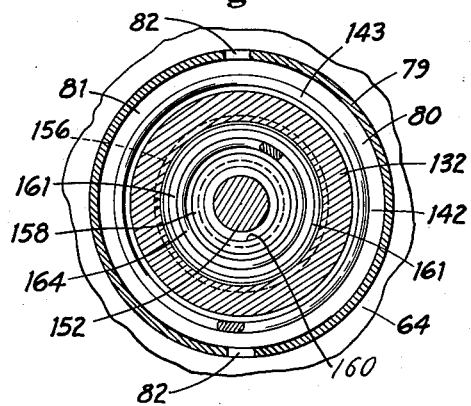
Fig. 4.
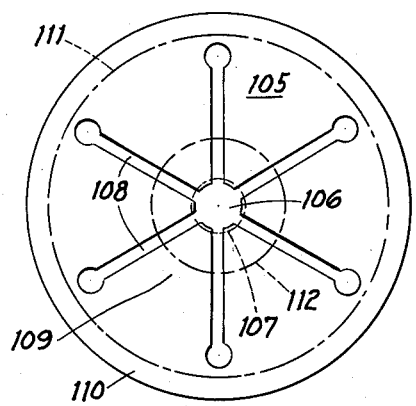
Fig. 8.
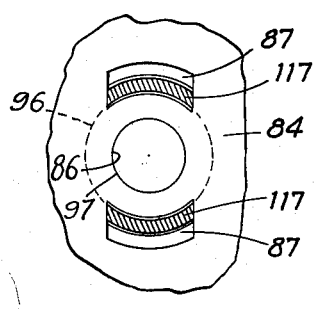
Fig. 6.
Inventor

United States Patent Office 2,977,935
Patented Apr. 4, 1961

Glenn T. Randol, 2nd Ave. and Paull St., Box 275, Mountain Lake Park, Md.

Filed Sept. 10, 1958, Ser. No. 760,203

11 Claims. (Cl. 121—41)

My invention relates to pressure differential operated servomotors adapted primarily as a booster for automotive brake systems, said invention being more specifically concerned with booster motors for operating in part the master cylinder in hydraulic brake systems, and which essentially have two principal working components; namely, a driver-controlled member and a power member movable by differential pressures on opposite sides thereof, the relative displacement of which being adapted to operate a followup poppet-type control valve of new and improved construction and operation.

The present invention has for a primary object improvements in control valve structure of the poppet-type wherein a pair of concentrically disposed elements having two pairs of cooperating seats and faces, one pair being between said elements and the other pair being between one of said elements and the power member, one utilized to control the latter; a pair of normally preloaded springs is employed, one of said springs reacting between said power member and one of said valve elements to balance pressures on opposite sides of said power member, and the other of said springs being of greater strength than the one spring, reacts between said valve elements to engage their cooperating face and seat, and thereby transmit force to engage the face on the one valve element with the seat on said power member, and then modulates to accommodate separation of said valve elements while said one valve element and power member are engaged as aforesaid, to establish differential pressures on opposite sides of said power member for power-activation of said booster motor.

According to one novel feature of my invention, reaction means is operatively associated with said master cylinder, power member and driver-control in such manner that the total reaction from said master cylinder is apportioned between said power member and driver-control to provide the driver with physical awareness of the degree of brake pressure in effect.

According to another novel feature of my invention, a shorter operating movement of the driver-control to operate the control valve is provided over that required to operate prior art control valves, thus rendering the control of the associated booster motor more predictable.

Another salient feature of my invention resides in the novel utilization of a pair of telescopically-related poppet valve elements, one of which controls admission of air and the other controls admission of a negative pressure (vacuum) to the power chamber to one side of said power member in the booster motor, with one of the poppet elements being movably supported on the casing of the booster motor independently of the power member to eliminate coaxial alignment therebetween thereby reducing wear between the parts for longer service life, and wherein a removable valve seat for the air valve and for the valve poppet of the vacuum valve, is provided to facilitate replacements economically.

With these and other objects and advantages in view, the invention consists of the new and novel combinations, constructions, and arrangements of parts as hereinafter more fully described, set forth in the appended claims, and disclosed in the accompanying drawings forming a part hereof, wherein:

Figure 1A is a longitudinal section of a portion of Figure 1 showing details of the residual pressure checkvalve associated with the discharge port of the master cylinder;

Figure 1B is an enlarged sectional view of a portion of Figure 1 showing details of the air filter device;

Figure 2A is a fragmentary sectional view of the control valve depicted in Figure 2, to clarify the details thereof;

Figure 3 is a transverse section on line 3—3 of Figure 2 showing details of the valve structure;

Figure 4 is another transverse section on line 4—4 of Figure 2 showing further details of the valve structure;

Figure 5 is a transverse section on line 5—5 of Figure 2 showing a principal part of the movable power member and the vacuum-air channel therein;

Figure 6 is an enlarged transverse section on line 6—6 of Figure 2 showing the thrust rod connection to another principal part of the power member, and a pair of diametrically disposed apertures therein through which reaction control elements operably project;

Figure 8 is a view of the resilient reaction disc per se showing the radial slots to facilitate dishing to place the disc under tension.

Like characters of reference designate like parts in the several views.

Figure 1:
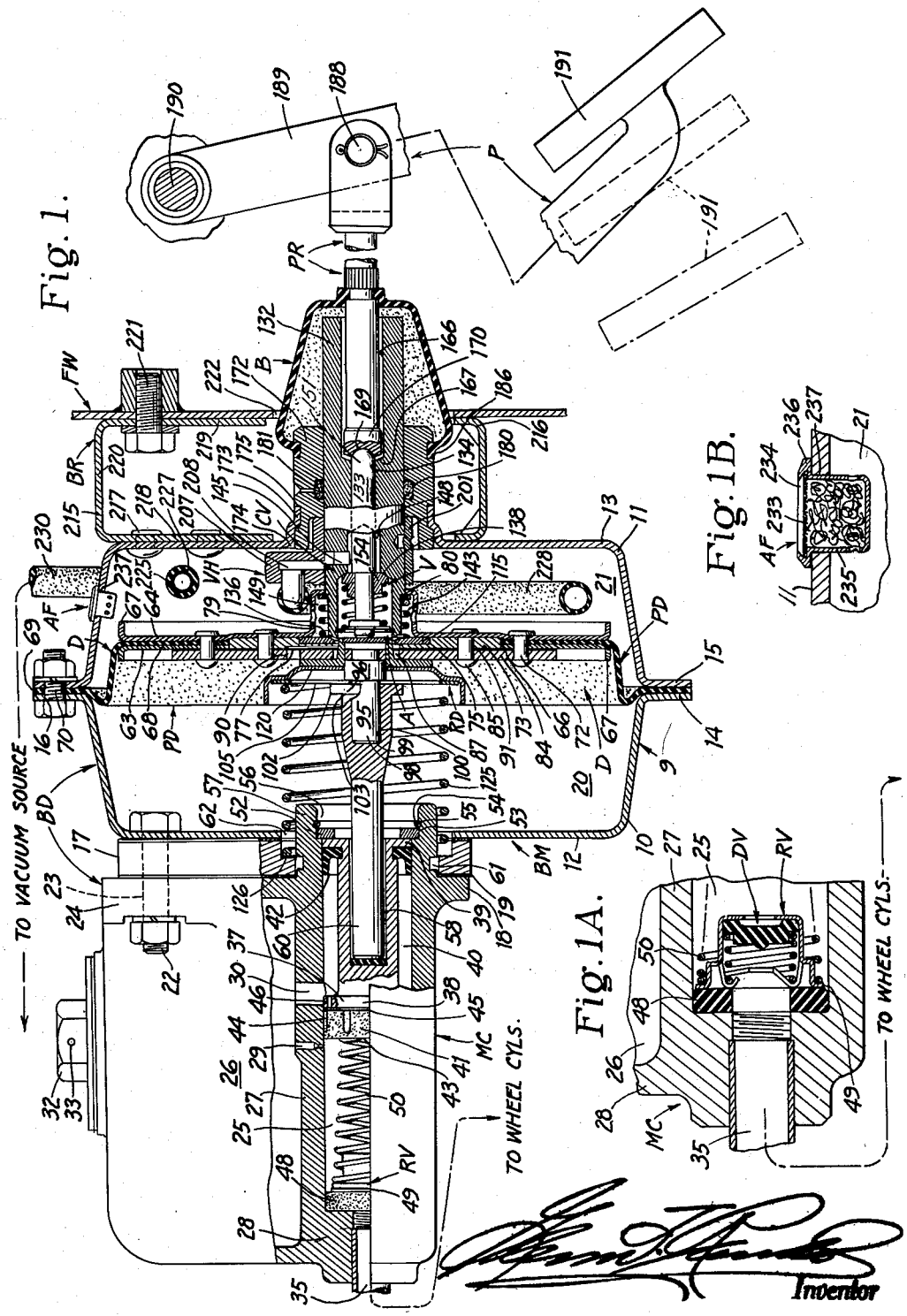
Figure 1 is a longitudinal section of a servomotor embodying the invention, and wherein the parts are in released positions.

Referring now to the drawings, and particularly to Figures 1, 2, 3, 4, 5, 6 and 8, my improved booster device is generally designated "BD" and comprises: the booster motor "BM," the hydraulic master cylinder "MC," the push rod "PR," and the operator-operated pedal mechanism "P" for actuating said push rod, all as shown in Figure 1. The booster-motor BM is preferably a pressure differential operated vacuum motor and comprises: a cylinder 9 formed by a pair of cylindrical cup-shaped casings or shells 10, 11 closed at their outer ends by end walls 12, 13 respectively, and each having their confronting open ends formed with outturned annular flanges 14, 15 respectively, the latter being provided with a plurality of registering holes 16 therethrough in circumferentially equally spaced relationship. Movable in the assembled motor casings is a power diaphragm assembly or wall "PD" under influence of differential pressures acting across opposite sides thereof. In ordinary automotive installations, a vacuum-operated motor is preferred to one operated by compressed air since the engine inlet-manifold may serve as the vacuum source rather than a pump which adds to engine load.

A forward mounting plate 17 is juxtaposed on the exterior of the end wall 12 and is sealed with respect to the confronting face of said wall and face of the mounting flange 18 on the master cylinder MC by flat gaskets 19 disposed on opposite sides of said plate. A variable pressure vacuum power chamber 20 is defined normally by the end wall 12 and forward side of the power diaphragm PD when the latter is in released position, and a constant pressure atmospheric chamber 21 is disposed between the end wall 13 and opposite face of the power diaphragm. A plurality of bolts 22, which project through suitable registering openings 23 in the end wall 12, plate 17 and flange 24 secure the master cylinder MC, plate 17 and booster motor BM in a unitary assembly best demonstrated in Figure 1.

The master cylinder MC is of conventional construction and therefore, will only be described briefly to insure a clear understanding of its operative relationship to the booster motor BM. This hydraulic cylinder has the usual pressure-working chamber 25 and a gravity-type fluid supply reservoir 26 therefore separated by a cylindrical wall 27 open at one end and closed at the other by an end wall 28, the closed end of the cylinder serving as the fixed end of said working chamber 25. The cylindrical wall 27 includes a compensating or bypass port 29 and an intake port 30 therethrough for controlling fluid communication between the reservoir and pressure-working chamber 25 and the interior of the cylinder 27 disposed rearwardly of said chamber. Additional fluid may be introduced into the reservoir through the removable filler cap 32 provided with a vent passage 33. The pressure-working chamber 25 serves to pressurize the braking fluid therein and displace it through the discharge port 35 which extends through the end wall 28 into the hydraulic lines to the wheel cylinders (not shown), such pressure being developed jointly by the force exerted by the power diaphragm PD when energized and the force exerted by the operator on the pedal mechanism P, or by either of the aforesaid operating forces acting independently of each other.

Reciprocably mounted in the cylinder 27 is a conventional spool-type piston 37 which will be referred to in certain of the claims as a hydraulic plunger, fluid-displacing member or, in a broader patent sense as a "fluid-displacing unit" which include all the elements associated with the piston 37 in the master cylinder MC. In this way flexibility in the terminology is provided to enable appropriate language in accordance with the definition of the invention set forth in the claims. The piston 37 has the usual longitudinally spaced head and bearing lands 38, 39 respectively with the ring-like space 40 therebetween, the latter having uninterrupted communication via the intake port 30 leading to the reservoir 26. The pressure-working chamber 25 is disposed between the inner face of the end wall 28 and the head land 38. The head land 38 carries a cup-shaped pliant seal 41 on its end face, and the bearing land 39 is fitted with a ring-like pliant seal 42 best depicted in Figure 1. When the piston is in its fully released position as shown in Figure 1, the edge of the seal lip 43 is disposed to the immediate right of the compensating port 29 to enable exchange of fluid between the reservoir and working chamber to compensate for excessive or insufficient fluid in the working chamber following release of the brakes as is well understood. The lip 43 carries a plurality of surface flutes, and optionally disposed between the back wall of the seal 41 and confronting end face of the land 38 is a star-shaped leaf spring shown at 44, the extremities of its legs are positioned to overlie the adjacent ends of passageways 46 through the walls of the head land 38 whereby fluid pressure on the seal 41 urges the legs 45 to tightly seal the ends of said passageways from the pressure chamber 25 during a braking application and upon release of the brakes during which a temporary vacuum may be created within the working chamber as a result of rapid return of the piston 37 toward released position, the spring legs are released to accommodate flexing to open said passageways and thus enable fluid from the space 40 to be drawn past the lip of the seal 41 via its flutes aforesaid into the chamber 25 to maintain the hydraulic braking system filled irrespective of the mode of reciprocating the piston 37. When the piston 37 is in released position as demonstrated in Figure 1, the compensating port 29 lies ahead of the edge of the seal lip 43 in close adjacency thereto, to enable such excess or lack of liquid in the working chamber 25 to be adjusted to or from the reservoir as the case may be so that a minimum pressure (non-activating) condition obtains. This minimum pressure conditions are established by the residual pressure valve "RV" which includes a one-way pressure discharge valve "DV," the latter being spring-loaded with respect to the valve RV. A removable ring-type valve seat 48, preferably made of pliant material, encircles the discharge port 35 in intimate contact with the finished surface on the working chamber side of the end wall 28. An annular flange 49 is provided on the residual valve, and a normally preloaded compression spring 50 biases this flange into engagement with the seat 48, and the other end of said spring reacts on the head land seal 41 to urge the piston 37 toward its normal released position which is defined by the outer face of the bearing land 39 in engagement with a backing washer 52 which is confined between an internal annular shoulder 53 and split retainer ring 54 partially embedded in an internal annular groove 55 provided in a counterbore 56 disposed in the outer end of a hub portion 57 in coaxial relation with respect to the cylinder 27. A blind end longitudinal bore 58 is provided in the outer end of the piston 37, which receives the free end of a work performing element or plunger 60 into engagement with the end of said bore whereby movement of the plunger is correspondingly imparted to the piston 37 as is understood. The hub portion of the master cylinder projects through coaxial circular openings 61, 62 in the mounting plate 17 and end wall 12 respectively of the vacuum booster BM into the power chamber 20.

The movable power diaphragm PD, which is referred to elsewhere in this specification and in certain of the claims as a pressure-responsive wall or unit, power diaphragm, power-piston or member, is reciprocably mounted in the booster motor cylinder 9, and comprises: a pair of cup-shaped juxtapositioned plates 63, 64 mounted back-to-back having coaxial circular openings 65, 66 respectively with their peripheral marginal portions flanged oppositely at 67. A ring-like flexible power diaphragm generally designated "D" is provided with inner and outer circular marginal portions 68, 69 respectively, the inner portion being disposed between the backs of the plates and the outer portion clamped between the casing flanges 14, 15 by bolts 70 inserted through holes 16 and registering holes 71 in the diaphragm to thus anchor the diaphragm to the inner side of the vacuum cylinder 9 in air-tight sealed relation in the assembled status of the booster motor BM shown in Figure 1. The inner portion of the diaphragm D is clamped in air-tight sealed relation between the plates aforesaid by a plurality of fasteners such as rivets 72. A circular spacer plate 73 is disclosed in the opening 65 of the plate 63 and the marginal portion 68 of the diaphragm in circular alignment therewith, said plate 73 being provided with a central circular opening 74, the right marginal face portion thereof having a circular recess 75 which is fitted with a removable ring-like valve seat 76, said seat being fixed to the plate 73 by the overlying clamping action of the plate 64. On the opposite side of the plate 73 is a radially disposed air-vacuum channel 77 leading from the circular opening 74 to an intermediate point thereon. Rearwardly extending from the opening 66 in plate 64 is a tubular extension or sleeve 79 which terminates in an inturned annular flange 80 to provide a ring-like space 81, said space communicating with chamber 21 via opening 82 through the cylindrical wall of said sleeve. A thrust plate 84 of larger diameter than plate 73 is secured to the forward (left) side of plate 73 by rivets 85, said plate 84 being provided with a central opening at 86, and a pair of diametrically opposed openings 87 radially disposed with respect to the opening 86, and an air-vacuum port 90 which maintains communication between the power chamber 20 and channel 77. A flat gasket 91 is provided between the plates 73, 84 to insure an air-tight seal therebetween.

A thrust-transmitting pilot member or stem 95 having a medially disposed external annular flange or shoulder 96 fixed coaxially adjacent the forward side of the thrust plate 84 as by welding the right end reduced extension 97 of the stem in the central opening 86, the terminus of the other reduced extension 98 of the stem normally engages the closed end 99 of an axial blind bore 100 of predetermined depth extending from the inner end of the work-performing plunger 60. Circularly aligned with the inner end of the plunger 60 is an integral exterior annular flange or shoulder 102 preferably of larger diameter than shoulder 96, said shoulders 96, 102 being coaxially disposed in normal predetermined spaced relation when the stem extension 98 abuts the closed end of the bore 100 best demonstrated in Figure 1. Accordingly, the aforesaid piloted connection between the plunger 60 and stem 95 accommodates relative separation of these two parts to widen said space 103 normally obtaining between said shoulders for an important purpose to appear. The normally engaged disposition of the forward end of the pilot stem 95 with the bottom 99 of the bore 100 in the plunger 60, which connection serves to slidably support said plunger on the power member PD, obtains not only during the de-activated status of the booster motor BM but also when a "straight-through" operation of the master cylinder MC is effected whether or not the motor is assisting.

Figure 2:
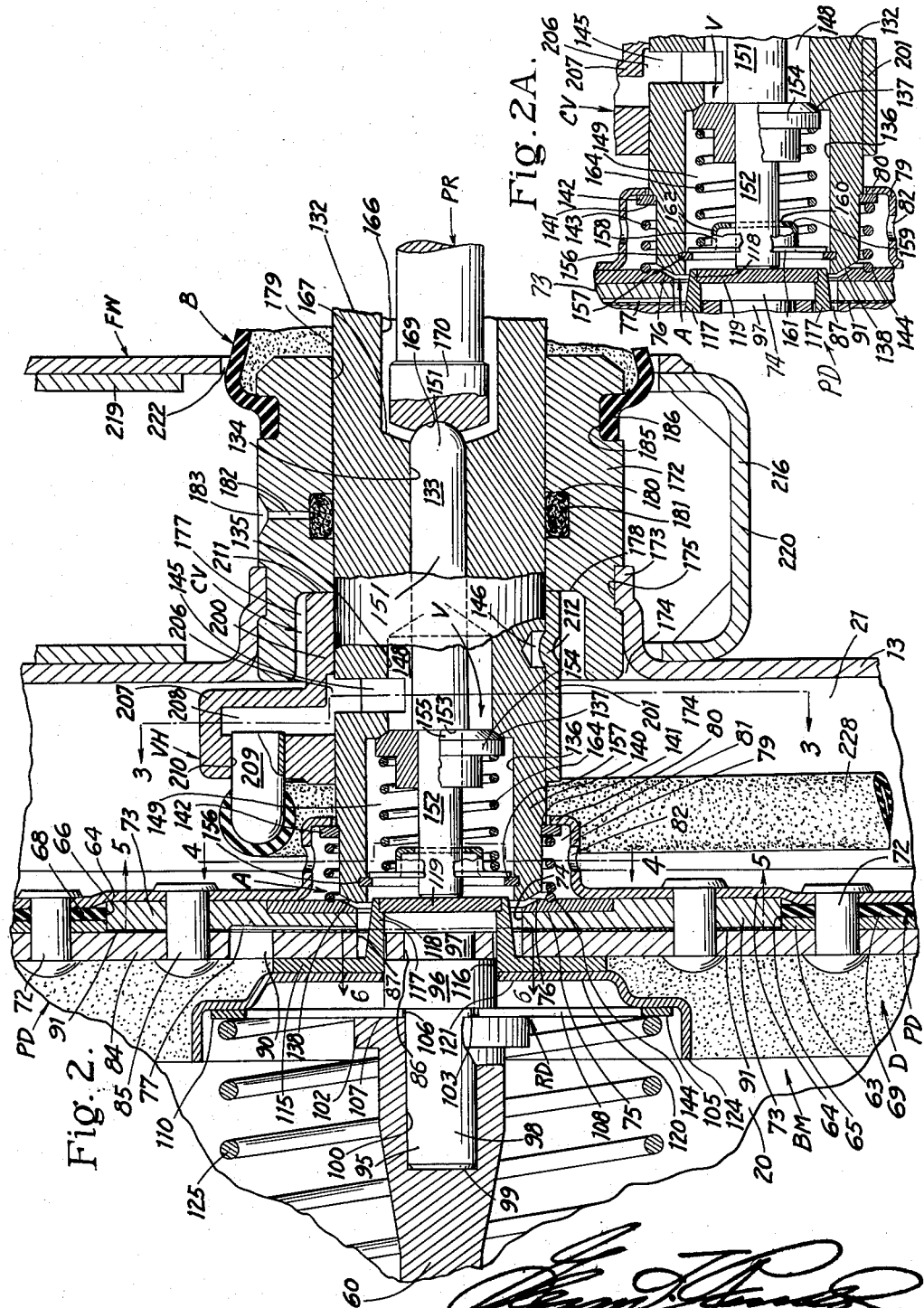
Figure 2 is an enlarged view of a portion of Figure 1 for clarity of detail.

Coaxially mounted forwardly of the thrust plate 84 is a balancing or reaction device generally designated "RD" and which comprises a normally relaxed resilient metallic diaphragm or disc 105, preferably of circular configuration and having a central aperture 106 through which the stem extension 98 projects to slidably support the disc in coaxial disposition with respect to the plunger shoulder 102, the marginal portion 107 of said aperture being loosely disposed between the shoulders 96, 102 since the thickness of the disc is, for example, .005 to .007 in. less than the normal width of the space between said shoulders to prevent fracture of the disc as a consequence of the hammer-action between the shoulders were the marginal portion impinged therebetween to receive direct impact while under tension, but to the contrary the marginal portion flexes between said shoulders during the dishing of the disc to accommodate energization of the booster motor BM as will be fully explained later. A plurality of radial slots 108 are provided in the disc 105 to facilitate "dishing" of said disc, said slots being exemplary only since a wide choice of cutout or slot patterns may be employed in lieu of the illustrated radial slots to reduce resistance to deforming the disc from a flat status to a concavity. The slots 108 convert the disc into a plurality of levers 109 interconnected at their outer ends by a peripheral web segment 110 to thus provide a lever-action characterized by flexibility. This lever-action induced by the operator force applied to the disc along the circular line 111, tends to force the power diaphragm PD rearwardly slightly and to apply pressure on the plunger shoulder 102 in a fluid-pressurizing direction to effect a slight separation of these two components (see Figure 7) as a result of the inner ends of the levers 109 bearing on the shoulder 96 and fulcrumed intermediately along the circular line 112 against the shoulder 102 on the end of the plunger 60. During the aforesaid separated status of the pilot stem 95 and plunger 60, the width of the space 103 will vary above normal in accordance with the magnitude of reaction from the master cylinder MC, and therefore, this space is always wider than normal during power-assistance for transmission of such reaction via the "cupped" disc 105 to the operator, but upon the booster motor reaching maximum output (power-run-out) and "straight-through" cooperation from the operator is required to develop the desired braking force, then the reaction disc becomes stabilized in its extreme "cupped" condition wherein reaction transferral thereby is constant due to restoration of the normal space 103 between the shoulders 96, 102 and the pilot stem 95 is engaged with the bottom 99 of the axial bore 100 in the plunger 60 which negates variable lever-action on the disc levers 109, as shown in Figures 1 and 2. Accordingly, deforming the disc 105 as aforesaid induced by the lever-action thereon sets up a progressively increasing tension in said disc in accordance with the distance the peripheral segment 110 is deflected out of parallel plane with the inner marginal portion 107 to serve an initial role of resisting inauguration of the power phase until the master cylinder has been conditioned for operation, and to provide reaction from the vacuum-booster BM for the operator to sense the progress of a brake-applying operation. This reaction is produced in accordance with the leverage-ratio and tension to which the disc is subjected for a given diameter and thickness and/or perforated pattern in said disc. When the power diaphragm PD becomes operatively energized, reaction is transmitted from the shoulder 96 to the inner ends of the spring-levers 109 fulcrumed on the shoulder 102 through the disc to the web segment 110 as will appear. As the power diaphragm increases its output on the ends of the spring-levers 109, the abnormally separated status aforesaid of the shoulders 96, 102 is progressively dissipated until the normal space 103 therebetween is restored as shown in Figures 1 and 2 wherein the stem extension 98 abuts the end wall 99 of the plunger 60 to provide a "straight-through" thrust on the plunger 60 from the power diaphragm PD as is understood while the peripheral segment 109 of the disc 105 is held forwardly under tension under influence of operator effort. At the point where the power output is sufficient to restore the shoulders 96, 102 to their normally spaced relation shown in Figure 2, whether or not this point defines power-run-out, reaction through the disc becomes substantially constant in consequence of the loss of lever-action between the power-actuated shoulder 96 and the fulcrum shoulder 102 on the plunger 60 since the plunger has reached a status of being substantially stationary due to the non-compressible nature of the column of brake fluid. But, as long as the working force of the vacuum-booster BM is sufficient to effect the braking pressure desired without eliminating all of the abnormally separated condition of the shoulders 96, 102 reaction from the power member PD increases progressively but not proportionally as the booster motor output increases due to the lever-action on and the resilient nature of the disc 105 which may also be termed a "spring-lever" since the disc combines lever and spring actions for transmission of reaction.

Slidably mounted on the annular flange 96 of the pilot stem 95 in normally juxtaposed relation to the forward side of the thrust plate 84, is a circular thrust plate 115 provided with a central circular opening 116 to slidably fit the flange 96, and extending rearwardly from the marginal portion of said opening is a pair of diametrically opposed arcuate segments 117 which extend through the openings 87 in the thrust plate 84, said segments having a rearwardly tapered outer surface, and adjacent each end thereof is a recessed arcuate shoulder 118 which describes a portion of a true circle of the given diameter. A circular plate 119 engages said shoulders for axial movement with the plate 115.

A circular cup-shaped spring seat or member 120 is slidably disposed on the flange 96 in normally juxtaposed relation with respect to the forward side of the plate 115. This spring seat comprises: a vertical bottom wall 121 constantly engaged with the monfronting side of the plate 115, a central circular aperture 122 through which the forward portion of the flange 96 projects to support the spring seat in operating position, and a peripheral offset in the wall 121 to provide an inner ring-like shoulder 123 against which the peripheral segment 109 of the resilient disc 105 bears, and which terminates forwardly in a circular horizontal wall or flange 124. A normally preloaded helically formed compression spring 125 encircles a portion of the plunger 60 with one end bearing on the marginal portion 126 of the opening 61 in the mounting plate 17 which is accommodated by the opening 62 in the end wall 12 being of larger diameter best shown in Figure 2. The other end of spring 125 reacts on the opposite side of the segment 109 of the disc 105 to maintain the peripheral portion aforesaid of the resilient disc 105 in engagement with the offset shoulder 123 and to urge the spring seat to act on the power diaphragm assembly PD via the plate 115 to urge the assembly toward normal released position shown in Figures 1 and 2. The reaction produced by this spring is in sharp contrast to that produced by the reaction disc 105 in that spring 125 offers resistance to the pedal mechanism P in relation to the distance the mechanism is moved from its normal released position and therefore, the reaction transmitted thereby to the pedal mechanism is not related to pressure conditions produced by the power assembly PD. In fact, the reaction and return spring 125 is somewhat transitory serving to provide increasing resistance on the pedal mechanism up to the point of the master cylinder MC becoming conditioned to pressurize the fluid therein to effect a braking application under influence of the energized bootser motor BM, and thereafter, the reaction becomes substantially constant due to the virtually stationary condition of the parts utilized to pressurize the fluid brought about by the non-compressible column of fluid as stated previously. This spring, therefore, serves the novel and useful purpose of supplementing the resilient disc 105 during conditioning of the master cyclinder MC to pressurize the braking fluid sufficiently to apply the brakes under influence of the vacuum-motor BM, but during the fluid pressurizing stage aforesaid, reaction from spring 125 is substantially constant while the resilient disc 105 continues to transmit a progressively increasing resistance on the pedal mechanism P during the power-applying stage up to the point where the vacuum-motor effects a "straight-through" operation on the master cylinder MC which point approximates introduction of assistance from the operator as will be more fully explained hereinafter.

The control valve mechanism generally designated "CV" is of new and novel construction and operation and comprises: an outer and inner telescopically-related element 132, 133 which will be more specifically referred to as a poppet sleeve and a poppet plunger respectively. The poppet sleeve 132 is provided with a medially disposed axial bore 134 which merges forwardly with primary and secondary conuterbores 135, 136 respectively, the latter counterbore extending to the forward end of the sleeve poppet. An angular valve seat 137 is provided at the point of mergence between the two counterbores. The forward end of the poppet sleeve terminates in an angular valve face 138 which is normally spaced predeterminately from its compemental valve seat 76 carried by the thrust plate 73 in alignment therewith which defines the open dispositions of what will be termed the "air-valve" designated "A." The poppet sleeve is further provided with a reduced diameter portion 140 which merges with the valve face 138 at its forward end and the opposite or rear end defines an external annular shoulder 141 with the normal external diameter of the poppet sleeve. A thrust washer 142 is disposed on this reduced portion in abutting relation with respect to said shoulder 141, and a normally preloaded compression spring 143 is operably disposed in the ring-like space 81 between the valve seat 76 which includes a circular surface groove 144 of arcuate cross section to act as a stabilizer for the engaging end of said spring, and the thrust washer 142 whereby the normally spaced disposition of the poppet sleeve is established as shown in Figures 1 and 2 by the opposite side of the thrust washer 142 urged into engagement with the inturned flange 80 on said clamping plate 64. Spaced from the inner end of the poppet sleeve 132 is a cross-slot 145 through the wall of the counterbore 135 and on the opposite side of the poppet sleeve is a blind hole 146 spaced rearwardly from the said cross-slot. The ring-like space in the primary counterbore 135 is utilized as a vacuum chamber 148, and the ring-like spaces in the secondary counterbore 136 and circular opening 74 in spacer plate 73 combine to provide a variable (air-vacuum) chamber 149 which is selectively connectible to the vacuum power chamber 20 in response to operating the control valve CV under influence of the pedal mechanism P which will be more fully detailed in the course of the description to follow.

Slidably disposed in the counterbores and axial bore aforesaid in the poppet sleeve is the poppet plunger 133 which comprises: a cylindrical rod 151 slidably supported in and projecting through the axial bore 134 and a forward terminating reduced diameter portion 152 which provides an external annular shoulder 153 at the point of mergence with the normal diameter of said rod, said shoulder being normally disposed substantially in circular alignment with the inner edge of the face of the valve seat 138. Pressfitted on the reduced diameter portion of the rod 151 into engagement with the shoulder 153 is a removable poppet head 154 which carries an angular valve face 155 for normally engaging its complemental valve seat 137 to define the open disposition of what may be termed a "vacuum-valve" designated "V" to thus isolate the vacuum chamber 148 from the air-vacuum chamber 149 to establish the "off" or closed disposition of the control valve CV. An internal annular groove 156 is provided adjacent the open forward end of the secondary counterbore 136 for reception of a split retainer ring 157. A cylindrical cup-shaped spring seat 158 having its closed end 159 provided with a circular opening 160 and its open end flanged at 161 to bear against said retainer ring 157 to prevent displacement of the seat, and the cylindrical wall 162 thereof serves as a guide for one end of a normally preloaded compression springs 164 operably disposed in the air-vacuum chamber 149 to bear against the flange of said seat 158, and the other end of this spring reacts against the left peripheral marginal portion of the poppet head 154 to urge its face 155 into engagement with its complemental seat 137 and thereby isolate the vacuum chamber 148 from the air-vacuum chamber 149 to thereby enable the air valve to open and thus place the power chamber 20 in communication with atmosphere to enable the power diaphragm to move toward its normal released position wherein the brakes are "off" as best demonstrated in Figure 2. In order to produce the usual follow-up action requisite for operation of the control valve CV provided by relative movement of the poppet sleeve and plunger to effect opening and closing of air and vacuum valves aforesaid, the relative preloaded strengths of the springs 143, 164 bear a definite relationship, that is, for example, commercial design suggests that spring 143 should be preloaded at approximately 10# while spring 164 may be installed under pretension of 20 to 30# according to the pedal "feel" desired in the slack takeup phase of the brake-applying operation.

Accordingly, spring 164 must be pretensioned above spring 143 since the air valve A must be closed prior to opening the vacuum valve V to energize the booster motor BM, and the deenergizing operation of the motor to take the brakes "off" must be carried out in the sequence of first closing the vacuum valve V and then opening the air valve A to admit air into the vacuum power chamber 20 via the air-vacuum chamber 149, channel 77 in the spacer plate 73, and port 90 in the thrust plate 84. A further essential operation of the poppet sleeve and plunger is the provision of the usual "lapped" relationship wherein both the air and vacuum valves A and V respectively are closed (seated) as a result of slight forward relative movement of the power diaphragm PD at any given halted position of the rod 151 when displaced from its normal released position. Thus, in effect, such "lapped"

disposition of the poppet elements 132, 133 enables the operator to hold the brakes "on" with minimum effort since the "lapped" disposition results from substantially counterbalanced forces from the motor BM and pressure reaction from the applied status of the brakes.

It is thus seen that spring 143 is effective to establish the normal separated condition of the power member PD and the poppet sleeve 132 wherein the air valve A is fully open, while the spring 164 is effective to establish the poppet head in engagement with its complemental seat 137 to close the vacuum valve V, and transmit thrust in accordance with its preloaded status to move both the poppet sleeve and plunger simultaneously through the initial phase of slack takeup to close the compensating port 29 and pressurize the fluid in the working chamber 25 at substantially the preloaded weight of said spring before it yields due to the arrested condition of the fluid-displacing unit to accommodate relative movement of the poppet sleeve and plunger with respect to each other within the limits defined by the space between the faces of the air valve A and the predetermined relative movement of the rod 151.

Figure 7:
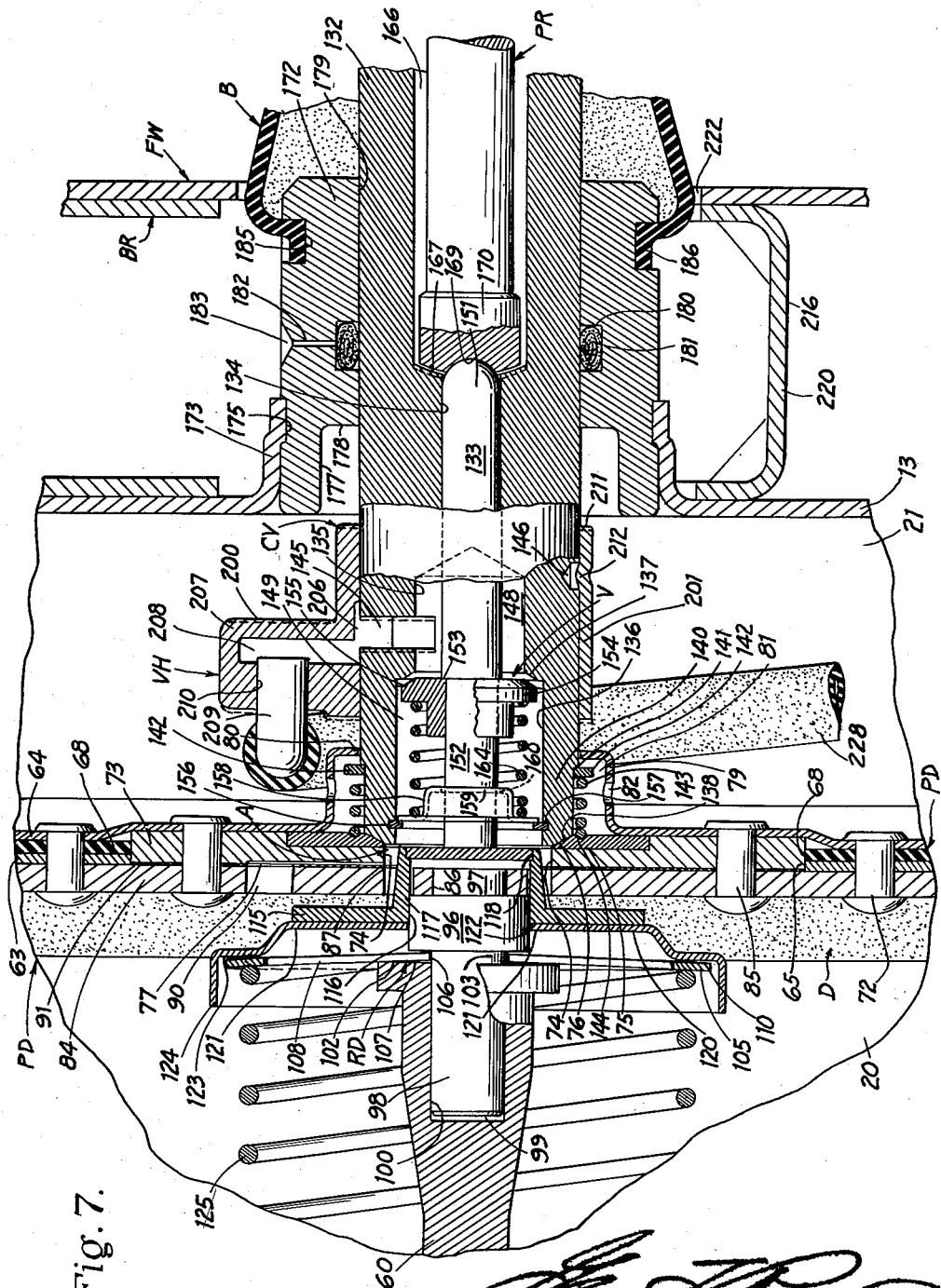
Figure 7 is a view similar to Figure 2 but showing the parts in operating positions.

The aforesaid conditioning operation of the master cylinder MC is effected in accordance with the thrust-transmitting capacity of valve return spring 164 which is supplemented by the resistance of the disc 105 to "dishing" to move the power diaphragm PD and fluid-displacing unit simultaneously to a position at which the brake fluid is initially pressurized as demonstrated in Figure 7, following which this spring and disc yield to accommodate relative movement of the poppet plunger 133 with respect to the seated poppet sleeve 132 to open the vacuum valve V and thereby controllably evacuate the air from the power chamber 20 to create the pressure differential across the power diaphragm to cause it to move forwardly farther in accordance with the follow-up action of the control valve CV under influence of the pedal mechanism P to decelerate the vehicle as desired.

The outer end of the poppet sleeve 132 is provided with a coaxial counterbore 166 which merges with the end of the axial bore 134 to form an internal annular shoulder 167 having a concave surface. The outer end of the rod 151 is semi-spherical and normally projects beyond the shoulder 167 into engagement with a complemental depression 169 in the end of the head 170 carried on the free end of the push rod PR which projects through the counterbore 166. The said head is provided with an end surface complemental to the concave surface on the shoulder 167 whereby in the normal disposition of the push rod head 170 it is predeterminately spaced from the shoulder 167 to define the relative movement of the rod 151 with respect to the poppet sleeve 132, said relative movement when taken up by engagement of the concave surfaces enable operator force to be directly applied to the plunger 60 via the air valve seats in engagement to operate the master cylinder MC in cooperation with the energized status of the motor BM or independently thereof in case of power inadequacy or failure whereby the master cylinder MC may be operated directly by operator force in the usual manner to apply and release the brakes without interference from the booster motor BM should the latter become inoperative.

The rear portion of the poppet sleeve 132 is slidably supported in a collar 172 which is affixed preferably by a crimping process applied radially inwardly to an outturned circular flange 173 formed by extrusion to provide a central opening 174 in the end wall 13 of the casing 11, said opening being coaxial with respect to the collar. This crimping process radially closes the flange inwardly into an external annular groove 175 in the outer surface of the collar to make the collar rigid with the shell 11 to serve the important function of slidably supporting the control valve assembly CV independently of the power diaphragm assembly PD and thus avoid alignment problems between the operator-operated components and the power-operated components.

The inner end of the collar 172 is provided with a counterbore 177 which forms an annular abutment shoulder 178 with the normal bore 179 through the collar. An internal annular channel 180 is provided in the normal bore for the reception of an oil wick 181 which is maintained saturated with oil via a radial passageway 182 through the wall of the collar which terminates exteriorly in a flared depression 183 for receiving the end of an oil can spout to inject oil into the wick aforesaid. In this way, the slidable poppet sleeve is lubricated for long service wear and ease of movement. An external annular groove 185 is provided on the collar rearwardly spaced from the groove 175 and which receives the forward enlarged end of an annular bead 186 of a conventional flexable dust boot "B," the smaller end of said boot terminates in an inturned portion with an annular bead edge which encircles the bush rod PR at the outer end of the poppet sleeve to thus isolate foreign matter from coming in contact with the finished surface on poppet sleeve which slides in the collar 172.

The outer end of the push rod PR is pivotally connected at 188 to an intermediate point on a pedal arm 189 which is, for example, pivotally suspended at its upper end at 190 on the vehicle, and the lower end of said arm terminates in a foot pad 191 whereby the operator may exert effort on the pedal mechanism P to operate the poppet sleeve 132 against the springs 143, 164 and the disc 105 to effect relative operation of the control valve element as is understood.

Encircling the poppet sleeve 132 is a valve housing generally designated "VH" and comprises: an upper and a lower semicircular segment 200, 201 respectively clamped around the poppet sleeve in air-tight sealed relation by a pair of cap screws 202 projecting through holes 203 in a pair of laterally extending outturned flanges or ears 204, into threaded engagement with holes 205 in complemental flanges or ears which terminate the other opposed arcuate portion of the upper segment, to thus tightly clamp the two halves 200, 201 on the poppet sleeve 132 to provide a rigid assembly thereof. Formed in the inner curved surface of the upper segment 200 is a rectangular-shaped arcuate cavity 206 having continuous communication with the cross-slot 145. Aligned with the cavity 206 is a rectangular-shaped upstanding hollow embossment or boss 207 integral with the circular wall of said upper segment, the interior 208 of said boss continuously communicates with the cavity. An elbow-type rigid tubular fitting 209 has one end pressed in a hole 210 through the inner side wall of the boss into communication with the interior 208 thereof. The outer ends of the circular walls of the said segments 200, 201 are circularly aligned to provide a circular face 211 which normally engages the shoulder 178 on the collar 172 to establish the control valve CV in its normal "off" released disposition. The lower housing segment 201 carries an oval-shaped hump 212 which engages the hole 146 to establish the operating relationship between the poppet sleeve and valve housing VH and also prevent relative displacement therebetween.

The booster-motor BM is preferably mounted in operating position on the forward (engine) side of the vehicle firewall "FW" so as to utilize for its control the suspended-type pedal. A bracket designated as a whole by the reference character "BR" and preferably comprising: upper and lower U-shaped members 215, 216 respectively is secured to the end wall of the rear casing 11 by rivets 217 projecting through registering holes in the front aligned legs 218 of each member, and the rear aligned legs 219 which are joined with their respective front legs by a horizontal segment 220, are secured to forward side of the firewall by bolts 221. Confronting arcuate cutouts 222 are provided in the horizontal edges of the front and rear legs through which the collar 172 and attached dust boot extend rearwardly for connection with the push rod PR best demonstrated in Figure 1.

This bracket mounting arrangement for the booster motor BM utilizes the same threaded connections on the firewall as were used to mount the conventional foot-operated master cylinder thus lending the present booster brake to easy field installation on after-market vehicles.

A rigid vacuum-inlet tube or fitting 225 projects through the cylindrical wall of the casing 11 at 226, the inner projecting portion 227 receives one end of substantially a convolution of flexible conduit or hose 228 and the other end of this hose is attached to the free end of the elbow fitting 209 in the upper valve housing whereby vacuum inlet to the arcuate cavity 206 thereof and relative movement of the control valve sleeve 132 with respect to the power diaphragm PD and booster cylinder 9 are accommodated. The outer projecting portion 229 of the tube 225 receives one end of a second flexible conduit or hose 230 and the other end of this hose is connected to a fitting in constant communication with the source of vacuum (not shown), which, for example, may be the engine inlet-manifold, thereby completing the vacuum line connection to the control valve mechanism CV.

An air filter designated "AF" of conventional construction is provided with a filter screen 233 over an inlet passageway 234 incorporated in a cylindrical housing 235 formed with an intermediate flange 236, the portion of the housing below the flange is pressfitted into a hole 237 through the cylindrical wall of the motor casing 11, to enable ingress of filtered air into the atmospheric chamber 21 of the booster motor BM for admission into the power chamber 20 via the open air valve A to de-energize the booster motor BM in response to removal of pressure from the pedal 189.

Operation

The operation of my improved booster brake mechanism BD will be apparent from the foregoing description but may be summarized as follows:

Assuming the booster apparatus BD is installed on a motor vehicle as the present disclosure exemplarily demonstrates in Figure 1, to operate the hydraulic brake system (not shown) commonly employed on such vehicles, is in released brake "off" condition as depicted in Figures 1 and 2. With the engine running, sub-atmospheric pressure (vacuum) is produced within the inlet-manifold (not shown) which is conveyed through conduit 228, fitting 209, interior 208 of the hollow embossment 207, cavity 206, cross-slot 145, to evacuate the air from the vacuum valve chamber 148, which conditions the control valve mechanism CV for operation to control energization of the booster-motor BM.

In the normally released disposition of the poppet sleeve and poppet plunger 132, 133 respectively portrayed in Figures 1 and 2, the vacuum-power and atmospheric chambers 20, 21 respectively are vented to atmosphere, the power chamber 20 being vented via the port 90, channel 77, air-vacuum valve chamber 149 and open air valve A to the atmospheric chamber 21 and the air filter AF, and as previously stated, the chamber 21 is in continuous communication with the atmosphere via said filter device. Accordingly, the power cylinder BM and related parts are in their respective normally released positions as shown in Figure 1 in readiness for a brake-applying cycle.

Initial depression of the pedal 189 to the first dashed line position in Figure 1 simultaneously moves the poppet plunger and sleeve 133, 132, power member PD and fluid-displacing unit comprising the hydraulic piston 37 which advances simultaneously with the plunger 77 against the reaction from spring 50 to the position of Figure 7 wherein the compensating port 29 is closed thereby conditioning the master cylinder MC for operation to apply pressure on the liquid in the pressure chamber 25 and displace it through the one-way chack-valve DV into discharge port 35 and thence via the hydraulic lines into the wheel cylinders (not shown) to expand the brake shoes (not shown) into contact with the internal frictional surface on the brake drums (not shown) rotatable with the vehicle wheels (not shown) to apply the brakes as is understood. This simultaneous initial movement of the parts aforesaid is effected by operator force on the pedal mechanism P acting through the pre-loaded joint thrust-transmitting capacities of the control valve springs 143, 164 and resistance of the reaction plate 105 against deformation (dishing) to place it under tension. Valve spring 164 is preferably installed under 15 to 20 pounds, or may be lighter where the resilient plate 105 is designed to produce sufficient resistance to effect the aforesaid unison movement of the parts as a preliminary conditioning operation of the master cylinder MC to pressurize the fluid therein. In any case, however, spring 164 must be installed under sufficient tension to overcome the reaction from spring 50 otherwise the aforesaid initial movement of the parts together cannot be accomplished under influence of the pedal mechanism P operated from its normally released position wherein the vehicle brakes are "off" and also the control valve CV is in closed "off" position. Spring 50 is conventional practice is usually set to retain a normally preloaded condition of around 8 to 12 pounds against the residual pressure valve RV to establish a minimum line pressure within that range external to the pressure-working chamber 25.

As the control valve CV, power member PD and master cylinder piston 37 move initially as a unit in opposition to reaction from springs 50, 125, to close the compensating port 29 under influence of initial operator force exerted on the pedal mechanism P, said force is transmitted from the push-rod PR and connected valve rod 151 indirectly through two paths; namely, (1) spring 164, ring 157, valve sleeve 132, spring 143 to stem extension 98 in engagement with the bottom 99 of axial bore 100 in the work element 60 and connected piston 37 in opposition to spring 50, and (2) thrust plate 115 and slidable spring cup member 120 opposed by spring 125. This unitary operation is effective to take up the slack in the brake system attended by initial pressurizing of the brake fluid. At this point, additional pressure applied to the pedal 189 induces the poppet plunger 133 and sleeve 132 to move farther to the left as a unit under their normal spring loads aforesaid, relatively to the power member PD accommodated by yielding of spring 143, to close the air valve A, followed in close sequence by relative movement of the poppet plunger with respect to the poppet sleeve, to open the vacuum valve V as shown in Figure 7. During the aforesaid relative movement of the poppet sleeve and plunger, the outer ends of the reaction levers 109 are tilted forwardly to apply lever-action between the fulcrum 102 and shoulder 96 whereby space 103 is widened to condition the reaction disc 105 to transmit reaction from the master cylinder MC to the brake-pedal. Since the work element 60 and connected piston 37 have reached a substantially stationary status due to opposition from the non-compressible column of brake fluid, widening of space 103 is accompanied by a slight relative rearward movement of the power member PD which moves valve seat 76 toward the valve face 138 on the poppet sleeve as the latter moves relatively toward the power member to engage said face and seat and thereby close the air valve A. Thus, spring 143 is forced to yield by the initial operator force acting on the poppet sleeve and reaction from the lever-action on the power member induced during said initial operation.

It is thus seen that operator force is transmitted via two paths simultaneously to bring about operative energization of the booster motor BM for power-assistance, and a third path of operator force transmission becomes effective in the event a "straight-through" operation is required from the pedal 189 to the master cylinder piston 37. This latter operation becomes effective upon maximum output of the booster motor, in response to sufficient operator force being applied to the brake-pedal to engage the push-rod head 170 with the shoulder 167 on the poppet sleeve with the face 138 engaged with its complemental seat 76 on the power member PD, thence to the pilot stem 95, work element 60 and the master cylinder piston 37. During the aforesaid "straight-through" operation the levers 109 of the reaction disc 105 are at maximum tilted position slightly forward of the Figure 7 position thereof. Thus, it may be said that the present booster motor BM is characterized by three paths of operator force transmissions; namely (1) to effect slack take-up in the brake system, (2) to operate the control valve CV to operating "on" position accompanied by conditioning of the reaction disc 105 to transmit reaction from the master cylinder MC during power-assist, and (3) to effect said "straight-through" operation of the master cylinder MC by the operator in the event of motor failure or inadequacy.

It is important to note here that the power member PD moves as a unit in the manner above described under influence of the preloaded force-transmitting capacity of spring 143, while the poppet sleeve and plunger 132, 133 respectively remain in their engaged relationship (see Figure 2) under reaction from spring 164 during the aforesaid unitary movement of the working parts, it being recalled that the preloaded status of spring 164 is greater than that of spring 143, but spring 164 is forced to yield when the working element 60 and hydraulic piston 37 become substantially stationary against the column of non-compressible brake fluid as a result of closing of the compensating port and subsequent slack take-up in the brake system. Upon the work element 60 reaching a stabilized condition, "cupping" of the reaction disc 105 is induced by applying additional operator force on the brake-pedal following initial slack take-up. This "cupping" of the disc accompanies yielding of the springs 143, 164 in that order, and the space 103 between the shoulders 96, 102 is augmented as shown in Figure 7 by the lever-action of the levers 109 therebetween in response to operator force applied to the outer interconnected ends of said levers via said thrust plate 115 and cup-shaped spring member 120. Therefore, yielding of springs 143, 164 and "cupping" of the reaction disc 105 to tension the latter to accommodate relative displacement of the valve elements 132, 133, cannot take place until the hydraulic piston 37 encounters sufficient resistance to halt further movement thereof into the pressure working chamber 25, such resistance being augmented by reaction from the return spring 50. The power member PD is forced to initially move with the valve elements as a unit under influence of initial operator force transmitted through spring 143 until the preloaded status thereof is modulated by increased force on the brake-pedal in opposition to the stabilized status of the piston 37. At this point, the poppet sleeve begins to move relatively to the power member PD and the latter relatively toward the sleeve under influence of the lever-action aforesaid, to close the air valve A and effect initial "cupping" of the reaction disc 105. Upon closure of the air valve A, the poppet sleeve 132 must now move as a unit with the power member PD to maintain the air valve closed against reaction from spring 143. During the aforesaid air valve closing, the poppet plunger 133 has moved as a unit with the poppet sleeve due to the heavier preloaded spring 164, and the reaction disc has been additionally "cupped" to increase its tension. At this point, the Figure 7 disposition of the parts occurs to establish differential pressures in the servomotor chambers 20, 21 in response to additional pressure on the brake-pedal to overcome spring 164 and thus effect relative displacement of the poppet plunger 133 with respect to the poppet sleeve 132 to connect the vacuum valve chamber 148 to the variable pressure valve chamber 149, and thereby, evacuate air from the power chamber 20 to effect the desired movement of the power member PD leftward to the position of Figure 7 wherein the vehicle brakes are applied. The added tension in spring 164 induced when the poppet sleeve and plunger are relatively displaced, is impressed on the poppet sleeve to oppose spring 143 from opening the air valve A. It is thus seen, that said initial pressure on the brake-pedal pressurizes the fluid in the master cylinder MC and connected hydraulic lines and wheel cylinders at substantially the same pressure as the force-transmitting capacities of the preloaded springs 164, 143 augmented by resistance of the reaction disc 105 to "cupping," and that yielding of springs 143, 164 and "cupping" of the reaction disc 105 are induced by fluid resistance reacting on the piston 37 augmented by its return spring 50, said resistance being of such magnitude as to bring said piston and connected working element 60 to a halt, and thereby enable the latter to serve as a fulcrum to induce the aforesaid lever-action of the disc levers 109 to widen the space 103 accompanied by disengagement of the end 99 of the axial bore 100 in the work element 60 from the forward end 98 of the pilot stem 95, in opposition to forward unitary movement of the control valve CV to close the air valve A followed in close sequence by the second stage of relative movement to open the vacuum valve V upon sufficient force being applied to the poppet plunger 133 to force spring 164 to yield. Such sequential yielding of these two springs being accompanied by "cupping" of the reaction disc 105 to tension the same for transmission of progressively increasing reaction from the master cylinder MC to the brake-pedal augmented by reaction from spring 125 up to the point that the fluid-displacement piston 37 becomes substantially stationary, and thereafter, reaction from this latter spring becomes substantially constant.

When the work element 60 reaches a stationary status as shown in Figure 7, the lever-action of the reaction disc levers 109 tends to force the power assembly PD slightly rearward relatively with respect to forward movement of the poppet sleeve and plunger 132, 133 under influence of the pedal mechanism P to sensitize opening and closing of the control valve CV, such relative movement of the power member and control valve elements and separation of the plunger shoulder 102 and thrust plate 84 resulting from the substantial stationary condition of the fluid-displacing unit (plunger 60 and hydraulic piston 37) induced by the pressurized column of brake fluid between the head of the piston 37 and wheel cylinder pistons (not shown) as is understood. The aforesaid relative movement of the control valve sleeve and plunger first positions the cooperating valve seat and face 76, 138 respectively into engaging relation to close the air valve A, and then disengages the engaging the cooperating valve seat and face 137, 155 respectively to open the vacuum valve V to connect the vacuum valve chamber 148 to the air-vacuum valve chamber 149 thus enabling evacuation of air from the power chamber 20 via the elbow-tube 209, conduit 228 and connected arcuate cavity 206 in the upper segment 200 of the valve housing VH, cross-slot 145 and vacuum valve chamber 148. As the air is evacuated from the power chamber 20, differential pressures are set up on opposite sides of the movable power member PD causing it to move leftward from an intermediate position corresponding to slack take-up to an operating position shown in Figure 7, and thereby actuating the hydraulic piston 37 to provide power assistance in applying the brakes. Prior to the booster motor BM becoming energized as aforesaid, the resilient disc 105 is deformed into a "cupped" configuration from its normal flat relaxed status. This deformation of the disc 105 is effected by operator force exerted on the control valve plunger 133 acting through plate 115 on the seat member 120 during slack take-up to set up tension in said disc, and simultaneously with this tensioning of the disc, the marginal portion of the disc adjacent the edge of the aperture 106 effects a lever-action between the shoulders 96, 102 aforesaid tending to additionally separate these elements and thereby widen the space 103 normally obtaining between them, against reaction from the valve springs 143, 164 to move the power diaphragm PD slightly rearwardly, and the substantially stationary condition of the plunger 60, due to the non-compressible nature of the column of brake fluid, resisting movement of said plunger and connected piston 37, to thus act as a fulcrum for the said lever-action through the disc 105 between its pressure points at the periphery 110 thereof against the offset shoulder 123 on the seat member 120, and the circular edge of the aperture 106 against the shoulder 96 carried by the thrust plate 84. Accordingly, the spring 164 plus resistance of the disc 105 to "dishing" force the fluid-displacing unit leftward to operate the master cylinder MC to take up the slack in the hydraulic lines until a point is reached where the pressure on the braking fluid and reaction from springs 50, 143 reach a factor substantially equal to the preloaded brake of valve return spring 164, the disc begins to resist "dishing" and thereby cooperates with the spring 164 to additionally pressurize the braking fluid as the booster motor BM reaches its energized status as shown in Figure 7.

At the point of relative movement between the control valve plunger and sleeve where the vacuum valve V is "cracked" placing the vacuum source in communication with the power chamber 20, the inner marginal portion of the reaction disc 105 is disposed at an angle with respect to the confronting abnormally spaced faces on the shoulders 96, 102, and the peripheral marginal portion 110 of the disc is disposed forwardly out of plane with said shoulders. Thus, it may be said that the reaction disc 105 is now conditioned to transmit reaction from the master cylinder MC to the pedal mechanism P. As the output effort of the booster motor BM increases it is transmitted progressively through the resilient lever-action of the disc to the peripheral marginal portion thereof with said plunger shoulder 102 acting as a fulcrum. This progressive reaction transferal from the master cylinder MC continues until the shoulders 96, 102 are forced into normally spaced relation wherein the full inner marginal portion of the disc therebetween assumes a substantially parallel relation with respect to said shoulders and the end of the stem extension 98 abuts the closed end 99 of the plunger bore 100. At this stage of power output, it may be said that a state of power-run-out has been reached, that is, the motor BM is providing maximum output which is insufficient to bring about the braking force required, the operator may increase his effort on the pedal 189 to make up such deficiency whereby the engaged cooperating seat and face 76, 138 respectively on the power member plate 73 and poppet sleeve 132 respectively transmit thrust directly to the thrust plate 84 to enable a "straight-through" application of joint effort from the motor and operator on the hydraulic piston 37. In this way the operator can instantly and automatically cooperate with the maximum output from the motor BM or apply the brakes directly at any time. Thus, the operator may team up with the motor BM at any time automatically by merely pressing through on the pedal 189 to bring about maximum stopping effort, and particularly stops in the emergency-panic category which the motor alone is not powered to handle. While the resilient nature of the reaction disc 105 eliminates proportional application of effort by the operator and motor BM, it does serve to provide a simple and efficient mechanism for transmitting the necessary increasing reaction to the pedal mechanism P to enable smooth energization of the booster motor. It should be importantly noted that this novel disc reaction principle is a continuous force-transmitting means, that is to say, the disc does not divert and/or absorb any of the operating forces, but to the contrary, all of such forces are transmitted undiminished to actuate the hydraulic piston 37 to effect operation of the vehicle brakes.

It is thus seen from the foregoing description of the operation of the resilient disc 105, that actually the slack takeup and initial pressurizing of the brake fluid defined by the dashed line positions of the pedal 189 in Figure 1, are effected in two stages; namely, the first stage is effected through the force transmitting capacity of the preloaded status of the valve return spring 164 in relation to the recation of springs 50, 143 and disc 105 and the second stage effects increased pressure on the brake fluid to a point of substantially halted status of the fluid-displacing unit (piston 37) in accordance with the amount of operator force which both the disc 105 and spring 164 are capable of transmitting though yielding under influence of the pedal mechanism P prior to the booster motor BM becoming energized in the manner above described. Stated differently, the force applied to initially operate the pedal mechanism P to the first dashed line position shown in Figure 1 and corresponding to the operated status of the booster apparatus BD immediately prior to Figure 7 position thereof, is impressed on the plunger 60 via the disc 105 and springs, 143, 164 aforesaid up to the point at which movement of the plunger 60 and piston 37 is arrested, and thereafter, further pressure on the pedal 189 receives reaction from the master cylinder MC as a function of the yielding resistance in the disc and spring 125 until the power output is at a maximum whereat the reaction from the master cylinder MC becomes substantially constant on the pedal mechanism P since the latter has now joined the power member PD to effect maximum pressure on the brake fluid should such be required.

The combined tensioning and lever-action characteristics of the disc 105 produce an extraordinary advance in the art to apprise the operator of the measure of braking pressure effective at a given position of the pedal 189, and while this reactive force is not proportional to either the pressurized status of the brake fluid and/or the power output from the vacuum-motor BM, it does serve in a new and improved manner to smoothly merge pedal and power-actuated forces and enables the operator to have predictable control over such power forces through the full range thereof. Thus the novel reaction device RD provides the operator with a measure of the braking force in effect simulating the more expensive and complicated types of power-brakes which utilize a coaxial hydraulic piston to provide a proportional measure of the total effective pressure on the braking fluid generated in conjunction with a larger hydraulic piston actuated by power means, and to, the hydraulic sealing problems are eliminated since the present vacuum-motor BM accommodates a conventional master cylinder such as illustrated in Figure 1 which is a self-contained sealed unit.

Optionally spring 125 may be employed in the present booster apparatus BD, and which reacts on the spring seat member 120 via the peripheral marginal portion 109 of the spring disc 105 opposite the portion which engages the offset shoulder 123 on the spring seat. This spring serves to stabilize the disc 105 on the spring seat member 120 and is characterized by increasing tension on the spring seat above a normally preloaded status progressively induced in response to the distance the pedal mechanism P is moved from released position in a brake-applying direction before the plunger 60 is halted in the manner aforesaid, at which point the reaction from this spring becomes substantially constant on the pedal mechanism P to supplement the reaction forces transmitted by the disc 105. The booster apparatus BD is completely operative without this spring since spring 50 alone has the capability of returning the fluid-displacing and motor parts to their released positions, however, if added resistance to pedal movement during the slack take-up stage is desirable for better braking control, spring 125 would be highly satisfactory for this purpose, and too, it would serve the additional function of reacting on the power disphragm PD via the spring seat member 120 in engagement with the thrust plate 84 via the thrust plate 115 to assist in returning the operating parts of the booster motor and master cylinder to their respective released positions shown in Figure 1, but when the seat member 120 is actuated under influence of the pedal mechanism P as aforesaid, the force of this spring is removed from the power member PD so that the vacuum-motor BM does not operate against it in a brake-applying direction, and therefore suffer no "power-loss." Spring 125 possesses another useful function as a supplement to spring 50 to provide a more rapid and sensitized return action on the fluid-displacing and motor parts, and therefore a quicker release of the brakes than would be provided by spring 50 alone since this latter spring is penalized by a maximum preloaded status and operating rate for the residual pressure valve RV. Stated differently, spring 50 cannot be rated higher than the requirements for control of the residual valve, and therefore, if reaction from this spring is insufficient to rapidly return the operating parts of the booster apparatus BD to their respective released positions as shown in Figure 1 after a brake-applying operation thereof, then the only recourse is to add the spring 125 to obtain the added force to effect such quick release of the parts, and at the same time augment resistance to initial slack take-up to condition the motor BM to operate.

Further considering the operational behavior of spring 125 it should be noted that it produces control characteristics in the way of reaction against which the control valve plunger 133 is adjusted to control operative energization of the vacuum-motor BM. This reaction increases above normal preloaded status of this spring in direct proportion to the distance the brake-pedal 189 is depressed, and therefore, such spring resistance alone would not necessarily have a magnitude correlated with the amount of braking force in effect at every position of the brake-pedal, and too, pedal-load would increase toward the end of the full operating stroke of the plunger 60 actuated by vacuum-motor BM to an undesirable degree which would defeat the objective of reduced pedal effort.

As spring 125 is additionally compressed above its normal preloaded status, it provides increasing resistance in relation to pedal movement up to the point where the fluid becomes pressurized, and thereafter, resistance becomes substantially constant on the brake-pedal as a consequence of the substantially stationary condition of the fluid-displacing parts acting on the non-compressible column of brake fluid as is understood. Since the fluid becomes pressurized at different stations along the full operating stroke of the motor-actuated plunger 60 due to wear on the brake linings and parts, and to leakage of the various seals in the hydraulic brake system, it will be appreciated that if the pressurized state of the fluid to apply the brakes becomes effective toward the end of the full operating stroke of the plunger 60, that reaction from the spring 125 can become severe resulting in a moderately "hard-pedal" due to rapid buildup in the force of this spring from its normal preloaded status, the latter providing the operator with accurate sensing to initially apply the brakes thus preventing sudden braking applications which could possibly result in a power-surge if the operator lacks this awareness as he initially applies the brakes.

Reduction of this spring principle to commercial usage, has demonstrated that the preloaded weight should be approximately 20# and rated at maximum compression corresponding to the end of the full operating stroke of the plunger 60 at 60# pressure which when transmitted through the pedal leverage ratio reacts on the operator's foot at 5 to 15# through the full operating range of the plunger 60 where a normal height pedal is employed; but if the pedal ratio is lowered to accommodate use of a "low-pedal" with less mechanical advantage, reaction from this spring increases proportionally to a limited extent that converts the low-pedal into a moderately "hard-pedal" as aforesaid through the stage of operating the valve sleeve and plunger 132, 133 from normal positions to operating positions to control operation of the vacuum-motor BM. Accordingly, this spring serves to best advantage as a reaction means by utilizing its yielding resistance through substantially the first-half of the series of pressurizing movements along the full operating stroke of the plunger 60 which may be had by keeping the brakes properly adjusted and the system free of leaks which service operations contribute to safer driving. If a lower rated spring is utilized then reaction of sufficient magnitude at points beyond the half-mark of the plunger stroke in a pressure applying direction does not provide the operator with the necessary physical perception of the braking force applied.

The foregoing operation completes what may be termed the "applied stage." With the brakes in applied condition, if operator effort on the pedal mechanism P is halted, the power diaphragm PD will slightly advance in a brake-applying direction and carrying with it as a unit the spring-loaded poppet sleeve 132 relatively to the control valve plunger 133 engaged with the pedal mechanism, to produce what may be termed the poised or holding stage at any applied position of the hydraulic piston 37. This latter operating stage results from the usual follow-up action of the control valve elements 132, 133 by a simultaneous closed condition of both the air valve A and the vacuum valve V induced by the aforesaid slight relative unitary movement of the power assembly PD and poppet sleeve 132 with respect to the poppet plunger 133 in the event brake pedal movement is halted as exemplified in Figure 7 by the dashed line position of the poppet sleeve 132. Thus, the brakes may be held "on" with minimum operator effort on the pedal 189 as a result of substantial counterbalance between the differential pressures acting on the power diaphragm PD and the existent hydraulic pressure in the hydraulic system against the head of the piston 37. If the motor BM should fail to be effective to provide power assistance, the force exerted by the operator on the pedal P will bring the cooperating seats and face 76, 138 respectively of the control valve CV into engagement and the free end of the push rod PR into engagement with the thrust shoulder 167, and wherein the relative operating movement between the push rod PR and control valve elements is fully taken up and the pair of valve elements 132, 133 relatively positioned to effect wide open unseated condition of the cooperating seats and face 137, 155, respectively, enabling the operator to operate the hydraulic piston 37 directly by physical force alone through the engaged pilot stem 95, if necessary, to attain full displacement of liquid in the hydraulic lines according to the braking force required to stop the vehicle. With the power phase effective, however, incremental depressing and releasing movements of the brake pedal 189 cause corresponding follow-up movements substantially of the power assembly PD to apply and release the vehicle brakes in a manner replete in the power brake art.

Due to the sensitiveness and exactness of the follow-up action of the control valve means CV and the ever present reaction of the spring 125 on the pedal mechanism P, there is never any tendency of the power phase to "over brake" at any given applied position of pedal movement which contributes the highly desirable feature of smooth stops at low vehicular speeds with instinctively predictable control. At high speeds dangerous "grabbing" or "locking" of the vehicle ground wheels is prevented thus producing smooth vehicular deceleration with reduced operator effort, in accordance with the pressure applied on the brake pedal.

The hydraulic pressure chamber 25 being conventional in construction and operation, enables the operator to "pump" the brakes to prevent dangerous brake "fade" whether the power phase is effective or not. Thus on long downgrades the operation of the brakes may be carried out in cooperation with power assistance or independently thereof in the usual manner by "pumping" the pedal to introduce more liquid from the reservoir 26 via intake port 30, passageways 46 and seal 41 into the pressure working chamber 25. During brake-applying movements of the hydraulic piston 37 the pressure developed thereby on the cup seal 41 firmly seats the peripheral outer side of the back wall against the star-shaped leaf spring legs to thus close the forward ends of the passageways 46 preventing escape of the liquid under pressure from the chamber 25 back to the reservoir 26.

When pressure on the pedal 189 is removed, spring 50, 125, 143, 164 and the diaphragm reactor 105 react to reset the fluid-displacing unit, power-diaphragm and control valve CV into their respective released positions shown in Figure 1, the spring seat member 120 in engagement with the thrust plate 115 biases the latter into engagement with the forward side of thrust plate 84 by spring 125 to assist in the return of said assembly and control valve elements to their respective released positions wherein the relative movement between the power diaphragm, control valve sleeve 132 and push rod PR is restored through the cooperative influence of the springs aforesaid which operations re-establish the "released" or brake "off" position shown in Figure 1 in which the power chamber 20 is again in communication with atmosphere via the open air valve A. As air enters the power chamber 20 via the open air valve A, air-vacuum valve chamber 149, channel 77, and port 90, the differential pressures are reduced, and eventually dissipated, enabling springs 50 and 125 to return the hydraulic piston 37 and plunger 60, and power diaphragm PD to their respective released positions portrayed in Figure 1 wherein the rear end of the control valve housing VH abuts the collar shoulder 178.

During the return stroke, a predetermined pressure is retained in the hydraulic lines by means of the conventional residual pressure check-valve RV as is understood. If the pressure in chamber 25 falls below atmospheric pressure during the return stroke, liquid is drawn through ports 46 from the reservoir 26 past the cup seal 41 into the chamber 25 to maintain said chamber filled. When the brakes are fully "off" or released as shown in Figures 1 and 2, the residual check-valve RV influenced to seat by spring 50 will establish the minimum residual pressure in the hydraulic lines, such as, for example, 5 to 10 p.s.i., and with the port 29 open excess liquid in the system returns through said port to the reservoir and vice versa if additional liquid is required in the system. Therefore, the port 29 is termed the "compensating" port.

If the power phase is disabled or inadequate for any reason, sufficient pressure may be applied on the pedal mechanism P to actuate the hydraulic piston 37 "straight-through" in the well known manner with increased operator effort, however, being required as is understood where the factory-installed pedal mechanism is the sole actuating medium for the brakes. Thus, my improved booster-mechanism BD may be operated in usual pedal fashion with no additional force required over that normally employed in operating a conventional hydraulic braking system devoid of power assistance.

During the releasing operation aforesaid of the booster mechanism BD, it should be importantly noted that the released position of the piston 37 is defined by the bearing land 39 brought into engagement with the backing washer 52 under influence of the piston return spring 50. Therefore, the biasing action of this spring on the plunger 60 and related parts in the booster motor BM ends at this point as shown in Figure 1 whereat the reactive and return spring 125 and valve return springs 143, 164 have disposed the power diaphragm PD and control valve sleeve and plunger 132, 133 respectively in their respective released positions best demonstrated in Figure 2. Since spring 125 in cooperation with spring 164 establishes the control valve parts in their normall "off" positions by the biasing force exerted thereby on the poppet plunger 133 in engagement with the poppet sleeve via their cooperating valve face and seat 155, 137 respectively, it follows that spring 143 is not essential to the operativeness of the air valve A, but is a safeguard to possible fortuitous movement of the power diaphragm PD toward the poppet sleeve and thus restrict or completely close the air valve A since the power diaphragm PD in normal released position is not stabilized against farther movement rearwardly to take up the spaced relation between the cooperating seat and face 76, 138 respectively wherein the air valve A is open. Accordingly, spring 143 is utilized to stabilize the power member PD in the position shown in Figures 1 and 2 wherein the spring 143 serves to keep the valve seat and face 76, 138 respectively separated and thus the air valve A open until closure thereof is desired to enable energization of the booster motor BM.

Further considering the relative preloaded strengths of the springs 50, 143, and 164, it has been found in commercial practice that the weight of spring 164 should, preferably, be greater than the combined weights of springs 50, 143, and therefore capable of overcoming these latter two springs to bring about the conditioning of the hydraulic master cylinder MC for operation and closure of the air valve A in the manner previously described. However, springs 164, 50 may be designed to substantially counterbalance each other in their respective preloaded status with spring 143 of less preloaded magnitude and still provide smooth mergence of the power phase with the initial foot-operated phase, however, with the weight of spring 164 greater than the preloaded weight of spring 50, spring 164 is capable of not only overcoming spring 50 but also of transmitting movement to the hydraulic piston 37 sufficiently to close the compensating port 29 and subsequently develop some pressure on the liquid in the hydraulic lines to provide the operator with a feel of resistance to pedal movement enabling the power phase to be brought in with unusual smoothness with reduced physical effort to produce the braking effect desired. Where spring 164 is appreciably less or substantially equal to the preloaded status of spring 50, operation of the present booster mechanism BD becomes somewhat erratic and less controllable due to the power phase being inaugurated concurrently with or before the foot-operated phase rather than in the former preferred sequence of following the foot-operated phase. In the arrangement where the power phase leads the foot-operated phase, spring 164 is insufficiently preloaded to give the driver any appreciable degree of resistance to pedal movement and, therefore, the power phase is brought in with less control on the part of the driver, and too, the power cylinder 9 is energized suddenly and moves initially rapidly since the liquid in the pressure chamber 25 cannot be pressurized until the compensating port 29 is closed which virtually gives the hydraulic piston 37 free unresisted movement through its initial phase before the pressure chamber 25 is conditioned by the power device BM rather than in the preferred arrangement by initial pedal stroke. As will be appreciated, such idle free movement of the power diaphragm PD and associated fluid-displacing parts accelerates initial operation of the power cylinder BM and consequently effects a sudden buildup of the pressure in the hydraulic lines tending to "overbrake," and at low speeds of the vehicle produces a locking effect on the vehicle wheels to the discomfort of the passengers and added danger of a collision from a vehicle following to the rear.

From the foregoing discussion of the relative strengths of the prings 164, 50, it is contemplated that these two springs should, preferably, be tensioned in their respective preloaded status with spring 164 stronger than spring 50, and that the reactive and return spring 125 should preferably be set in its preloaded condition at such strength as to provide the operator with the degree of pedal resistance supplemented by the operation of the valve return spring 164 and tensioning of the reaction disc 105 to provide him with a definite predictable control over the inauguration of the power phase for smooth braking control for all stopping conditions with minimum expenditure of physical effort throughout the full operating stroke of the pedal mechanism P. It is important to note that the resilient disc 105 plays an important role in the pedal "feel" produced by my improved vacuum-booster BM since this disc resists deflection during the conditioning of the master cylinder MC for operation thus assisting in this conditioning phase, and subsequently transmits reaction forces from the power diaphragm PD progressively as the latter's output builds up to give the operate a definite sensing of the relation of his input to the output effort of the motor to the point of power-run-out.

It is important to note that during the tensioning (dishing) of the disc 105 which is preferably accomplished partially prior to the vacuum-motor BM becoming energized for smooth mergence of the power phase with the operator initiatory phase, the disc in conjunction with the spring 164 despite the latter is yielding and therefore increasing its tension above normal preloaded status, transmits force from the pedal mechanism P to additionally pressurize the brake fluid to take up the shoe-to-drum clearance and thus initiate braking action sufficiently to cause slight vehicular deceleration to occur before either of the above reaction means become effective to transmit the output of said motor to the pedal mechanism P. However, if spring 164 is lightly preloaded, as for example, at 10 to 15#, then this spring is provided with less capacity to transmit thrust before yielding and as a consequence, the motor phase becomes effective in response to less initial pedal travel as is understood. As soon as the pressure on the braking fluid reaches a factor substantially corresponding to the thrust-transmitting capacity of the normal spring-load on the valve plunger 133 movement of the fluid-displacing unit (piston 37) becomes substantially stationary due to the non-compressible column of braking fluid, and, not until this latter condition obtains can the control valve CV be operated relatively as aforesaid to condition the reaction device RD to transmit reaction forces from the motor BM since it is this arrested state of the piston 37 that renders the fulcrum point on the plunger 60 effective for the disc to function.

It is therefore, believed manifest from the foregoing description augmented by the drawing, that my improved poppet-type control valve construction is capable of producing smooth energization of the booster motor BM in response to an extremely short stroke from the pedal mechanism P so that the present booster mechanism BD may be employed on vehicles having low-pedal brake control, and that the "on" and "off" positions of the control valve are sensitively correlated and may be utilized in conjunction with the combined reaction means comprising the reaction disc 105 and reactive spring 125, or either of these reacting elements separately.

It is contemplated that the balancing disc 105 may be constructed as a centrally apertured resilient disc, or a pattern of perforations may be incorporated in it to facilitate "dishing" to place the disc under tension.

A further variation in the control valve construction is provided by making at least one of the valve seats of the air valve A and vacuum valve V removable for easy service replacement, and to fabricate the removable seats from nonferrous or plastic material to increase the service life of the cooperating seats along with increasingly effective seating engagement therebetween to insure an air-tight seal when engaged. Thus, my improved poppet-type valve construction may be readily and inexpensively serviced by renewing the removable seats carried by the power member PD and the thrust-rod 151.

While the present disclosure shows the circular inturned edge 80 of the sleeve 79 slightly spaced from the outer cylindrical surface on the poppet sleeve 132, this edge may be disposed in close tolerance engaging relationship with respect to the poppet sleeve to serve as a bearing support therefor to stabilize the control valve assembly CV and power diaphragm PD in substantially coaxial disposition which would insure full surface contact between the cooperating seat and face 76, 138 of the air valve A should the power diaphragm tend to deviate or "cock" from its true path of movement. If more bearing surface is required between said flange edge and poppet sleeve such may be provided by extruding said edge as a cylindrical sleeve for slidably supporting the poppet sleeve.

Another characteristic of the present disclosure should be observed here, and which is concerned with the space obtaining between the seats of the air and vacuum valves A and V respectively when open, such space being intentionally exaggerated to clarify the depiction. Normally, this space is rather minute so as to provide a sensitively operating control valve utilizing the shortest possible movement of the control pedal 189. In the Figure 7 depiction of my improved booster motor BM, the parts are shown in initial operating positions wherein the operator has moved the cooperating parts to effect "dishing" the reaction disc 105 whereat the vacuum valve V has reached a "cracked" (open) position to inaugurate operative energization of the power diaphragm PD to effect the braking pressure desired. Accordingly, the normal space obtaining between the shoulders 96, 102, would lessen as the output of the booster motor BM increases with the output being progressively transmitted through the disc against the poppet sleeve 132 to the brake-pedal as a measure of the power output of said motor. It will therefore, be appreciated that the abnormally wide opening of the air and vacuum valves A and V respectively, is intended to clarify the working relationship of these two valves with respect to each other and to other parts of the control valve and the booster motor rather than illustrating the actual operated status that would obtain were the booster motor in a commercial installation.

The interaction of the control valve CV, power diaphragm PD and the reaction disc 105 produces a novel and patentable arrangement, and features of construction and operation of the cooperating elements comprising these components and more efficient cooperation of such elements to deform the disc into a configuration corresponding to a "Belleville" washer. The perimetrical segment 110 of the disc is moved forwardly relatively with respect to the inner marginal portions 107 of its fingers which movement tends to widen the space normally obtaining between the shoulders 96, 102. This spring-lever action is induced by the substantially stationary condition of the plunger 60 resisted by the column of brake fluid under initial pressure. Accordingly, movement of the inner ends of the radial fingers of the disc is less than the outer ends thereof. The ratio of this movement is defined by the distances between the inner and outer pressure points and the intermediate fulcrum point shown in light dashed circles on the disc in Figure 8. In the embodiment shown, the disc ratio is approximately 4:1 and should increase as the weight of the vehicle increases. As the booster motor BM increases its output in response to continued operator force on the brake-pedal, the work is divided between the operator and motor on substantially the same basis as the ratio aforesaid provided by the disc, but as will be appreciated, due to the resilient nature of the disc fingers, the work is not divided proportionally but rather in progressive accord with the joint effort exerted by the operator and motor to obtain the improved brake-applying results. The action of the balancing disc 105 is to maintain a progressively increasing division of work between the operator and motor BM so that regulation of the booster motor BM may be smoothly controlled by the valves A and V. Thus, as soon as the vacuum chamber 20 has been sufficiently evacuated of air to set up the required differential pressures on opposite sides of the power diaphragm PD in a brake-applying direction that the master cylinder piston 37 and motor diaphragm are balanced, spring 164 immediately closes the vacuum valve V in response to slight additional relative movement of the power diaphragm in a brake-applying direction, so that the opposing forces acting on the power diaphragm, via the disc 105, and piston 37 are balanced without one overpowering the other. If too little air has been admitted to the motor chamber 20, then operator force on the poppet sleeve 132 via the poppet plunger 133 overpowers the power member PD causing the cooperating seat and face 137, 155 respectively of the vacuum valve V to slightly separate thereby accelerating evacuation of the power chamber 20 into the inlet-manifold (not shown) or other source of subatmospheric production, until the equilibrium is restored. Upon release of pressure on the brake-pedal, pressures on opposite sides of the power diaphragm PD are immediately equalized via the open air valve A which enables the piston 37, power diaphragm PD and control valve sleeve and plunger to return to their respective "off" positions urged by the springs 50, 125, 143 and 164, and the disc 105 resuming its normal flat relaxed disposition.

It is therefore, seen that the booster motor BM assists operator effort applied through the pedal mechanism PM to operate the brakes of the motor vehicle, and that the control valve means CV controls the motor BM according to operator force applied to the pedal 189 in a predetermined relation to each other defined by the resiliency and leverage ratio of the fingers characterizing the balancing disc 105. Such predetermined relation being dependent on the length of the disc fingers, their leverage ratio and resilient factor, and the reaction from the hydraulic piston 37 is equal to the sum of the forces exerted jointly by the operator on the pedal mechanism PM and the power diaphragm PD of the motor transmitted concurrently through the reaction disc 105.

The disc in the present disclosure is shown flat in its normal relaxed state (see Figures 1 and 2) and requires pressure on the pedal 189 to "dish" it so that its reactive transferal function is operative as depicted in Figure 7. However, the "dished" configuration may be incorporated when the disc is produced, and in such case, the disc would be installed relaxed though "cupped" so that when pressure is applied on the pedal mechanism PM the disc would be urged to flatten and then slightly "cup" in the opposite direction at wide open position vacuum valve V. The advantage of prefabricating the disc slightly "cupped" is to increase its resistance to fatigue thereby stabilizing its resiliency to prevent change in pedal characteristics resulting from loss of resiliency caused by "cupping" the disc out of a normal flat plane.

A further salient advantage provided by my poppet-type control valve is freedom from multiple lubricating points. Only a single part requires lubrication which is the outer cylindrical surface portion of the poppet sleeve 132 which slidably projects through the bearing collar 172 on the motor casing 9. The aforesaid oil wick 181 serving to maintain these working surfaces properly lubricated.

Reference is now made to the terminology used in the foregoing description and in the appended claims in which the identifying expressions and/or terms employed are intended to convey meanings which include the range of reasonable equivalents in the patent sense. For example, the expressions "motor," "power cylinder," "power booster," "vacuum-booster," "vacuum-cylinder," "power assembly," "power device," "booster mechanism," "power means," "power mechanism," are intended to include any casing and/or chamber having a pressure-responsive movable assembly therein, whether such assembly includes a solid piston or a flexible diaphragm, or some other member serving the same purpose. The terms "front," "rear," "forward," "bottom," "top," "right," "left," "vertical," and other directional words or characters are intended to have only relative connotation for convenience in describing the structure as illustrated in the drawing, and are not intended to be interpreted as requiring any particular orientation with respect to associated structure external to the present disclosure or the operating position thereof.

Although a single embodiment of my invention has been disclosed herein and which is believed well calculated to fulfill the objects above stated, it will be appreciated that I do not wish such to be limited to the exact construction and/or arrangement of parts shown, since it is evident that modifications, variations, changes and substitutions may be made therein without departing from the proper scope or fair meaning of the subjoined claims.

Having thus described my invention, I claim:

1. A control valve construction for use in cooperation with a pressure differential operated member; the improvement which comprises: a stationary sleeve; a pair of telescopically-related relative displaceable poppet-type valve elements provided with a cooperating face and seat respectively normally engaged, with a portion of one of said valve elements being slidably supported in said sleeve; an intermediately disposed axial bore in the one valve element for slidably receiving a normal diameter extension on one side of the other valve element; another face and a seat cooperating therewith on said one valve element and said member respectively and normally spaced apart; a first and second counterbore coextensive with the inner ends of said axial bore and said one valve element; a third counterbore extending from the opposite end of said axial bore to the opposite end of said one valve element; a thrust-shoulder defined by the mergence of the third counterbore with said axial bore; a ring-like vacuum chamber coaxial with said valve elements, and defined by said first counterbore; an opening in the one valve element leading from the vacuum chamber to a source of pressure different from atmosphere; a cylindrical cup-shaped member having a peripheral outturned flange disposed in the second counterbore in spaced relation with respect to said vacuum chamber; an annular groove adjacent the inner end of said second counterbore; a split retaining ring engaging said annular groove, and adapted to engage the flange on the cup-shaped member to prevent relative axial displacement thereof; a reduced diameter extension on the other side of the other valve element and which projects through the second counterbore into a circular opening in said first-mentioned member; an air-vacuum chamber defined by said second counterbore and said circular opening; a normally preloaded spring operably disposed in said second counterbore to react between the flange on said cup-shaped member and the other valve element to urge the face on the latter into engagement with its cooperating seat on the one valve element to thereby isolate the vacuum chamber from the air-vacuum chamber; an external annular shoulder formed on the one valve element by diminishing its inner end portion; a washer-type element disposed on said reduced portion to abut said annular shoulder; another sleeve-type member secured to one end to said first-mentioned member and having a cylindrical wall portion spaced from and in circular alignment with the reduced portion on said one valve element, to provide a ring-like atmospheric chamber therebetween which continuously communicates with atmosphere via a port through said wall; an inturned annular flange terminating the opposite end of said cylindrical wall and which is normally engaged by the same side of said washer-type element that abuts said annular shoulder to limit separation of the one valve element with respect to said first-mentioned member; another normally preloaded spring of less strength than said first-mentioned spring, and adapted to encircle said reduced portion on said one valve element and wholly contained within said atmosphere chamber to react between said first-mentioned member and said washer-type element and thereby simultaneously engage the latter with said inturned flange and annular shoulder to establish the normally spaced disposition of the one valve element with respect to the first-mentioned member wherein the said atmospheric chamber is in communication with said air-vacuum chamber; an operator-operated thrust-rod operably projecting into the said third counterbore in the one valve element, into engagement with the opposite end of the other valve element projecting through the axial bore aforesaid, with a portion of said thrust-rod in a predetermined normally spaced relation with respect to said first-mentioned thrust-shoulder whereby operator effort exerted on said thrust-rod initially moves said valve elements as a unit as a function of the thrust-transmitting capacity of said first-mentioned spring in normally preloaded status, to engage the face on the one valve element with the seat on said first-mentioned member upon overcoming the second-mentioned spring, and then to displace the other valve element relatively to the one valve element to disengage the face on the one valve element from the seat on the other valve element upon yielding of said first-mentioned spring, to place the vacuum chamber in communication with the air-vacuum chamber isolated from atmosphere by the engaged condition aforesaid of the one valve element with said first-mentioned member.

2. A control valve constructed in accordance with claim 1 provided with a valve housing comprising: a pair of semicircular segments clamped about said one valve element in air-tight sealed relation for movement therewith, one of said segments having a hollow embossment communicating with the opening leading from the vacuum chamber, the other segment serving to clamp the one segment on the one valve element; a circular shoulder provided by outer circularly aligned ends of the two segments, and adapted to engage a confronting portion on the stationary support sleeve aforesaid to establish the normally released position of said one valve element; a depression in the outer cylindrical surface of the one valve element; and an inwardly disposed embossment on the clamping segment for engaging said depression to establish the operating relationship between the assembled valve housing and the one valve element.

3. A control valve constructed in accordance with claim 2 in which the seat on the first-mentioned member is removable and comprises: a ring-like member embedded in a complemental recess in the marginal portion of the circular opening in said first-mentioned member, with the seat formed on the inner marginal portion of said ring-like member.

4. A control valve constructed in accordance with claim 3 in which the other valve element comprises: a ring-like member removably disposed on the reduced extension thereof in press fitted engagement with a shoulder defined by the point of mergence between said oppositely disposed extensions whereby said extensions and the ring-like member move as a unit.

5. In a fluid pressure operated servomotor including a casing in which a movable power assembly is actuatable by a pressure differential on opposite sides thereof, said power assembly dividing the interior of said casing into a constant pressure chamber and a variable pressure chamber, a source of pressure different from atmosphere connectible to said variable pressure chamber, and an operator-operated member having a normally released position, the improvement which comprises: an element movable to perform work under influence in part of power-actuation, movement of said element being opposed by a normally preloaded spring; control valve means including a telescopically-related poppet sleeve and poppet plunger adapted to have operative follow-up association with said power assembly to control the same, said poppet sleeve and plunger being relatively displaceable from normal "off" disposition wherein said servomotor chambers are interconnected to balance pressures therein for power-inactivation of said servomotor, to operating "on" disposition wherein said servomotor chambers are isolated to enable establishment of differential pressures therein for power-activation of said servomotor as a function of the reaction from said work element; a valve face on said poppet sleeve cooperating with a valve seat on said power assembly, said face and seat being normally spaced apart; stop means between said poppet sleeve and power assembly for defining the normal spaced disposition of said face and seat respectively thereon, another normally pre-loaded spring reacting between said poppet sleeve and power assembly for biasing the sleeve and assembly toward normally spaced disposition; a valve face on said poppet plunger cooperating with a valve seat on said poppet sleeve, said last-named face and seat being normally engaged; abutment means between said poppet plunger and sleeve; third normally pre-loaded spring of greater strength than the first-named spring reacting between said abutment means and said poppet plunger, to bias the latter and the sleeve toward normally engaged disposition; an annular valve chamber in the said poppet sleeve, said valve chamber being divided into an opposed vacuum and a variable pressure chamber by said poppet plunger when its valve face is engaged with the valve seat on said poppet sleeve, said variable valve chamber being normally vented to atmosphere via normally spaced disposition aforesaid of the face and seat on said poppet sleeve and power assembly respectively, and said vacuum valve chamber having continuous communication with said source; a fluid passage interconnecting said variable valve chamber with said variable pressure chamber in the servomotor; an abutment on the poppet sleeve; a link interconnecting the poppet plunger with said operator-operated member, the free end of said link having a portion normally spaced from said abutment, and engageable therewith to effect "straight-through" operation of said power assembly with the face and seat on said poppet sleeve and power assembly respectively engaged, said poppet sleeve and plunger being movable initially as a unit under influence of said operator member in opposition to said last-named spring in normally preloaded status to overcome said second-named spring and thereby effect engagement of the face on said sleeve with its cooperating seat on the power assembly to isolate the variable valve chamber from atmosphere, followed by yielding of said last-named spring induced by the engaged status aforesaid of the poppet sleeve and power assembly face and seat respectively, to accommodate relative displacement of the poppet plunger with respect to said sleeve upon additional operator force being exerted on said operator member, to disengage the face and seat respectively thereon and thereby interconnect the vacuum and variable pressure valve chambers in the poppet sleeve to vary the pressure in the variable pressure chamber in the servomotor for power-activation thereof.

6. A fluid pressure operated servomotor constructed in accordance with claim 5 including a movable spring seat member operatively associated with that side of the power assembly opposite the control valve means; mechanical means projecting through said fluid passage for interconnecting said spring seat member with said poppet plunger for movement together relatively to and conjointly with said power assembly when the poppet sleeve and plunger are relatively displaced to control said power assembly; a fourth normally preloaded spring reacting between said spring seat member and a portion of the casing of said servomotor to oppose operator-actuation of said seat member, said last-mentioned spring being characterized by increasing tension progressively induced as a function of the distance the operator-member is moved from normal position.

7. A fluid pressure operated servomotor constructed in accordance with claim 5 including reaction means for transmitting proportionally increasing reactive forces from said work element to said poppet plunger and operator-operated member during power-activation of said servomotor.

8. A fluid pressure operated servomotor constructed in accordance with claim 7 wherein said reaction means comprise: a plurality of levers operably incorporated between one end of said work performing element and said power assembly with one end of each of said levers acting on said poppet plunger, and the opposite ends of each of said levers engaging said power assembly with corresponding intermediate portions on each of said levers having fulcrum engagement with said one end of said work element; and cooperating means on said power assembly and said one end of said work element for supporting the latter to have relative sliding movement with respect to said power assembly under influence of said levers operated by initial operator force on said operator-operated member, to condition said levers to transmit reaction from said work element during power-activation of said servomotor.

9. In a booster-type fluid pressure activated servomotor having a fluid chamber enclosure and a movable wall dividing said chamber into opposing fluid pressure chambers, a source of pressure different from atmosphere connectible to one of said pressure chambers, the improvement which comprises: a poppet-type control valve having a pair of coaxially disposed telescopically-related poppet elements, one of said elements having a longitudinally spaced valve seat and face; a valve face on the other element cooperating with the valve seat on the one valve element, and normally engaged therewith; a valve seat on said movable wall cooperating with the face on said one element, and normally spaced apart; spring means having a normally preloaded spring reacting between said movable wall and said one element to separate the cooperating seat and face respectively thereon to normally spaced disposition; another spring means having a normally preloaded spring reacting between said pair of poppet elements to engage the cooperating face and seat respectively thereon, said last-mentioned spring being of greater strength than the first-mentioned spring; a fluid valve chamber in said one element, said other element when the face thereon is engaged with its cooperating seat on the one element, dividing said valve chamber into a variable pressure and a vacuum valve chamber, the latter chamber having continuous communication with said source; an operator-operated member having a normally released position and operable therefrom to displace the other valve element relatively to said one valve element in the sequence of said valve elements having initial unitary movement as a function of the preloaded status of said other spring means, and thereby effecting engagement of the face on the one valve element with its cooperating valve seat on the movable wall to isolate the variable valve chamber from atmosphere followed by relative displacement aforesaid of said poppet elements to disengage the face on the other valve element from its cooperating seat on the one valve element to thus connect said vacuum chamber to said variable valve chamber to establish differential pressures on opposite sides of said movable wall to move the same; and a fluid passage interconnecting said variable valve chamber with the variable pressure chamber in the servomotor.

10. In a fluid pressure operated servomotor including a casing in which a power assembly is movable from a normally released position by a pressure differential on opposite sides thereof, said power assembly dividing the interior of said casing into a constant pressure chamber and a variable pressure chamber, and a source of pressure different from atmosphere communicable with said variable pressure chamber the improvement which comprises: an operator-operated assembly including a main control valve occupying a normal "off" position from which it is movable relatively with respect to said power assembly in response to operating said operator assembly from normal position, to control energization of said servomotor, said control valve including a pair of telescopically-related poppet-type elements each being provided with a face selectively engageable with a complemental seat on the power assembly and on one of said elements respectively, the face on the one element being normally spaced from the seat on said power assembly, and the face on the other element normally engaged with the seat on the one element in the normal "off" position of the control valve; a variable pressure chamber and a vacuum chamber in the other valve element on opposite sides respectively of said one valve element when the face thereof is engaged with its complemental seat on the other valve element; a fluid passage between said variable valve chamber and the variable pressure chamber in the servomotor; a pair of normally spaced engageable portions on said power and operator assemblies respectively to define the relative movement of said valve elements; a normally preloaded spring reacting between said other valve element and said power assembly to effect separation thereof to normally spaced disposition; another normally preloaded spring reacting between said valve elements to bias them toward normally engaged disposition, said last-named spring being of greater strength than the first-named spring; an element movable to perform work under influence in part of said power assembly, movement of said work element being opposed by a third normally preloaded spring; a projection on that end of said work element adjacent the power assembly, said projection being radially offset from the axis of said work element; another projection on the power assembly in confronting spaced relation with respect to the first-named projection, said last-named projection being radially offset intermediate from the axis of said work element and said first-named projection; a movable member acted on by said operator assembly; reaction mechanism having a plurality of radial levers with their inner ends normally disposed in the space between said projections and their outer ends bearing on said movable member whereby the projection on the work element in engagement with intermediate portions on said levers serves as a fulcrum to increase the space between said projections, and thereby condition said levers to transmit progressively increasing reaction from said work element to said operator assembly to the point of power-run-out, in response to simultaneous movement of said movable member and said valve elements relatively to said power assembly, as a function of the normally preloaded status of said second-named spring; and mechanical means interconnecting said movable member with said one valve element for movement together.

11. In control valve mechanism for use in cooperation with a wall movable under influence of a pressure differential, and a source of pressure different from atmosphere communicable with one side of said wall to establish said pressure differential, the improvement which comprises: a pair of interfitting poppet-type valve elements, each having a face, with the face on one of said valve elements normally spaced from a cooperating seat on said wall, and the face on the other valve element being normally engaged with a cooperating seat on said one valve element; a variable pressure chamber in said one valve element to one side of said other valve element; a vacuum chamber in said one valve element on the other side of said other valve element, said variable pressure chamber being selectively connectable to atmosphere when the face on said one valve element is spaced from its cooperating seat on said wall, and connectable to said vacuum chamber when the face on said other valve element is disengaged from its cooperating seat on said one valve element, with the face and seat on said one valve element and wall engaged; a normally preloaded spring reacting between said wall and one valve element to establish the normal disposition of the latter element; another normally preloaded spring of greater strength than said first-mentioned spring reacting between said valve elements to effect normal disposition aforesaid thereof; limiting means having a pair of normally engaged portions carried by said wall and one valve element respectively to define the normal disposition of said valve elements; and an operator-operated member having a normally released position, and adapted to act directly through an interconnecting link on said other valve element to initially displace both of said valve elements simultaneously to effect engagement of the face on the one valve element with its cooperating seat on said wall to isolate the variable pressure chamber from atmosphere, followed by relative displacement of the other valve element with respect to said one valve element in that order to disengage the face on said other valve element from its cooperating seat on the one valve element to place the vacuum chamber in communication with said variable pressure chamber as a function of sequential yielding of said first and second-mentioned springs in that order in response to the face on the one valve element becoming engaged with its cooperating seat on said wall, and thereby inhibit further relative movement of said one valve element against the first mentioned spring.

References Cited in the file of this patent

UNITED STATES PATENTS

| | | |
|---|---|---|
| 2,275,697 | Stelzer | Mar. 10, 1942 |
| 2,322,063 | Schnell | June 15, 1943 |
| 2,331,238 | Schnell | Oct. 5, 1943 |
| 2,646,665 | Rockwell | July 28, 1953 |
| 2,745,383 | Hupp | May 15, 1956 |
| 2,828,719 | Ayers | Apr. 1, 1958 |
| 2,832,316 | Ingres | Apr. 29, 1958 |
| 2,842,101 | Price | July 8, 1958 |
| 2,894,490 | Ingres | July 14, 1959 |

UNITED STATES PATENT OFFICE
CERTIFICATE OF CORRECTION

Patent No. 2,977,935                                                       April 4, 1961

Glenn T. Randol

It is hereby certified that error appears in the above numbered patent requiring correction and that the said Letters Patent should read as corrected below.

Column 3, line 58, for "positionsd" read -- positioned --; column 6, line 68, for "monfronting" read -- confronting --; column 7, line 56, for "compemental" read -- complemental --; column 12, line 3, for "chack-valve" read -- check-valve --; same column, line 27, for "50 is" read -- 50 in --; line 69, for "close" read -- closes --; column 13, line 42, after "accompanies" insert -- sequential --; column 15, line 26, for "brake" read -- strength --; column 16, line 15, for "recation" read -- reaction --; same column, line 56, for "to" read -- too --; line 58, for "a" read -- the --; column 17, line 17, for "suffer" read -- suffers --; line 70, for "in" read -- from --; column 19, line 20, for "spring" read -- springs --; line 68, for "a" read -- the --; column 20, line 8, for "normall" read -- normally --; line 71, for "accelerates" read -- accelerate --; line 72, for "effects" read -- effect --; column 21, line 48, after "133" insert a comma; column 23, lines 41, 51 and 60, for "PM", each occurrence, read -- P --; same column, line 62, after "position" insert -- of --; column 24, line 74, for "to" read -- at --; column 25, line 14, for "atmosphere" read -- atmospheric --; column 26, line 22, for "normal" read -- normally --; line 30, after "sleeve;" insert -- a --; column 28, line 48, for "intermediate" read -- intermediately --.

Signed and sealed this 19th day of January 1965.

(SEAL)
Attest:

ERNEST W. SWIDER                                      EDWARD J. BRENNER
Attesting Officer                                      Commissioner of Patents